United States Patent
Kishino

(10) Patent No.: US 9,805,759 B1
(45) Date of Patent: Oct. 31, 2017

(54) MAGNETIC DISK DEVICE, ADJUSTING METHOD THEREOF, AND MANUFACTURING METHOD THEREOF

(71) Applicant: KABUSHIKI KAISHA TOSHIBA, Tokyo (JP)

(72) Inventor: Keiichi Kishino, Chigasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/449,355

(22) Filed: Mar. 3, 2017

(30) Foreign Application Priority Data

Sep. 23, 2016 (JP) ................. 2016-185785

(51) Int. Cl.
  *G11B 5/02* (2006.01)
  *G11B 20/10* (2006.01)
  *G11B 5/09* (2006.01)
  *G11B 20/18* (2006.01)

(52) U.S. Cl.
  CPC .......... *G11B 20/10222* (2013.01); *G11B 5/09* (2013.01); *G11B 20/1816* (2013.01)

(58) Field of Classification Search
  CPC .. G11B 5/012; G11B 5/00; G11B 5/02; G11B 2005/0021; G11B 2005/0005; G11B 20/10009; G11B 5/09; G11B 5/3903

USPC ............ 360/27, 46, 59, 55, 75, 110
See application file for complete search history.

(56) References Cited

U.S. PATENT DOCUMENTS

| | | |
|---|---|---|
| 8,233,230 B2 * | 7/2012 | Yano et al. ............... G11B 5/02 360/75 |
| 8,929,013 B1 | 1/2015 | Mastrocola et al. |
| 9,064,539 B1 | 6/2015 | O'Brien et al. |
| 2013/0128375 A1 | 5/2013 | Livshitz et al. |

* cited by examiner

*Primary Examiner* — Nabil Hindi
(74) *Attorney, Agent, or Firm* — Patterson & Sheridan, LLP

(57) ABSTRACT

An adjusting method for a magnetic disk device including a disk, a head that writes data on the disk, a controller circuit that outputs write data and a control signal related to the write data, and an integrated circuit that outputs a write current to the head, includes adding a delay to a timing of polarity inversion of one bit of the write data or the control signal, outputting the write data and the control signal added with the delay from the controller circuit to the integrated circuit, outputting from the integrated circuit to the head, the write current having a current value that is changed at one of timings of polarity inversion of the write data, according to the control signal, and adjusting a deviation between the write data and the control signal, based on the output write current.

20 Claims, 18 Drawing Sheets

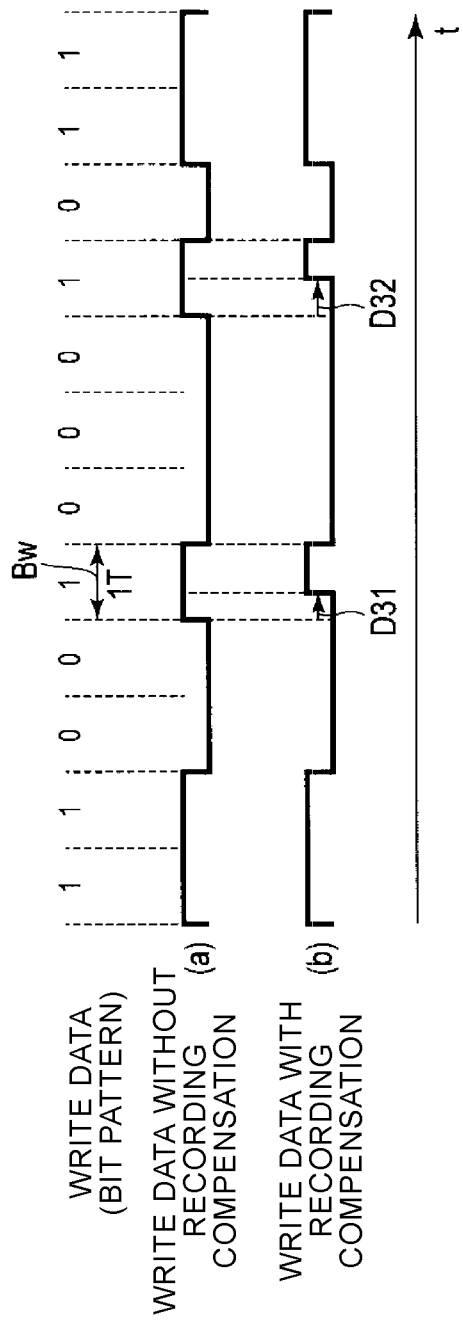

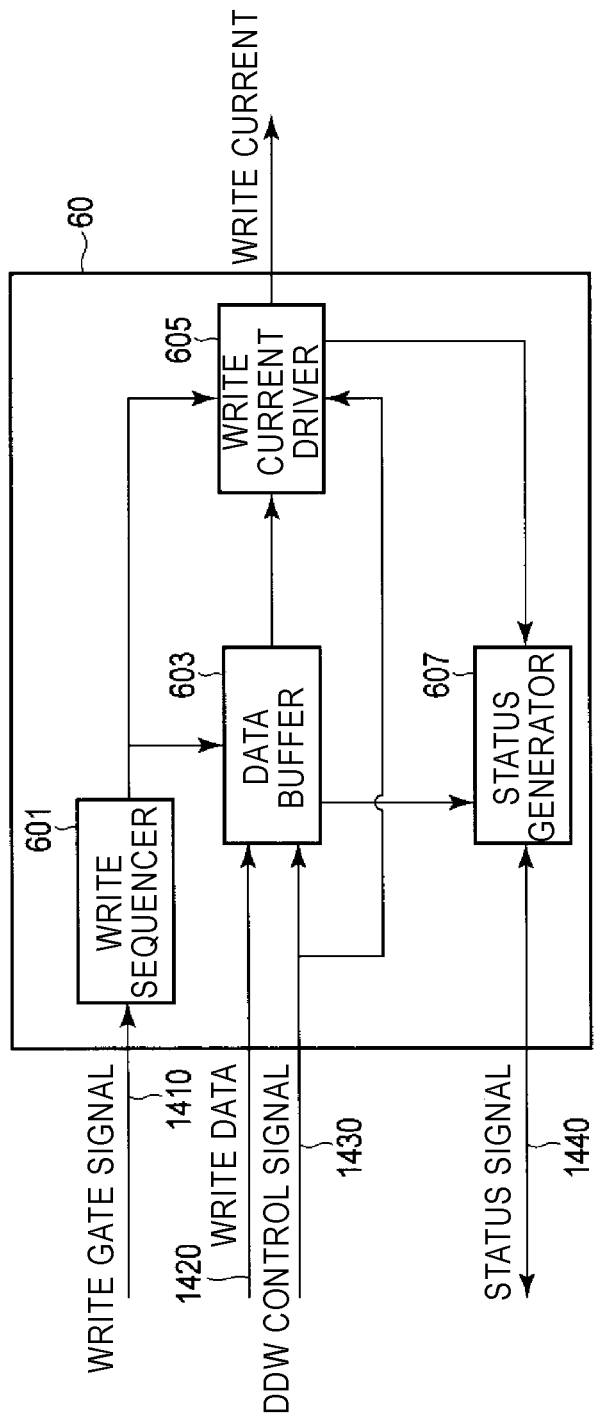

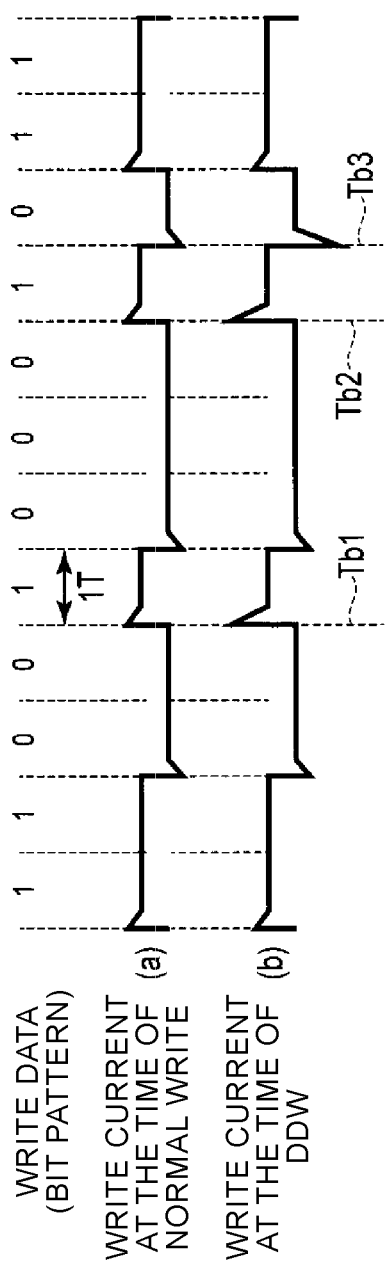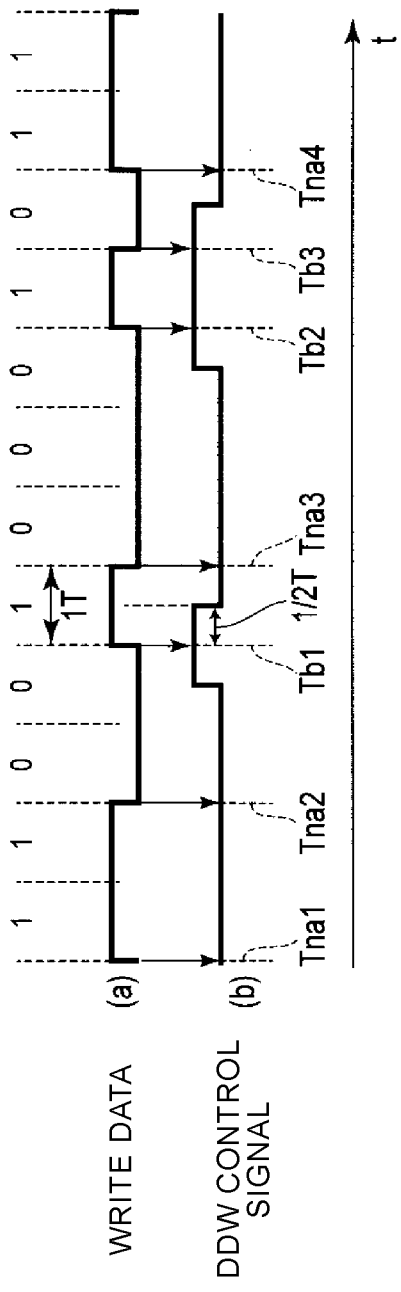

*FIG. 12*
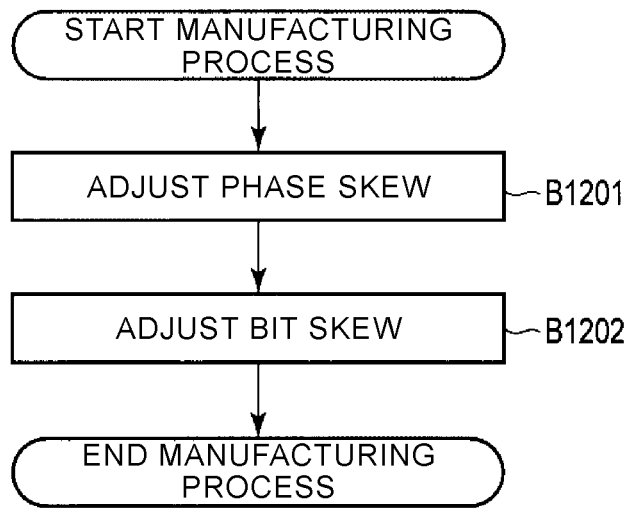
*FIG. 13*
| REFERENCE NUMBER | 0 | 1 | 2 | 3 | 4 | 5 | STATUS |
|---|---|---|---|---|---|---|---|
| EXPECTATION | 1 | 0 | 0 | 1 | 1 | 1 | ... |
| DETECTION RESULT 1 | 1 | 0 | 0 | 1 | 1 | 1 | OK |
| DETECTION RESULT 2 | 1 | 0 | 0 | 1 | 0 | 1 | NG |
*FIG. 14*
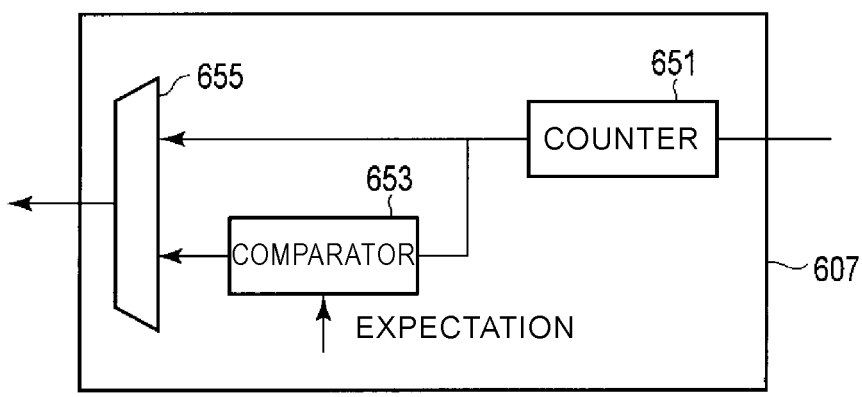

MAGNETIC DISK DEVICE, ADJUSTING METHOD THEREOF, AND MANUFACTURING METHOD THEREOF

CROSS-REFERENCE TO RELATED APPLICATION

This application is based upon and claims the benefit of priority from Japanese Patent Application No. 2016-185785, filed Sep. 23, 2016, the entire contents of which are incorporated herein by reference.

FIELD

Embodiments described herein relate generally to a magnetic disk device, an adjusting method thereof, and a manufacturing method thereof.

BACKGROUND

Recent magnetic disk devices include a function of changing a level of write current (write current value) according to a data pattern of write data. This function is called data dependent write (DDW), a pattern dependent write (PDW), or the like. In a magnetic disk device not equipped with this function, a head amplifier IC (preamplifier) outputs a uniform write current, which corresponds to a data pattern of write data output from a read/write (R/W) channel, to a head. By contrast, the magnetic disk device having the DDW or PDW function needs to synchronize signals for changing a value of the write current at least in the head amplifier IC according to the data pattern of the write data.

DESCRIPTION OF THE DRAWINGS

FIG. 3 is a view for illustrating one example of write compensation processing.

FIG. 4 is a schematic view illustrating a configuration example of a write system in a head amplifier IC.

FIG. 5 is a view for illustrating one example of DDW processing.

FIG. 6 is a view for illustrating one example of the DDW processing in an R/W channel mode when no write compensation processing is executed.

FIG. 12 is a flow chart illustrating one example of a method for manufacturing the magnetic disk device according to the first embodiment.

FIG. 13 is a view illustrating one example of a method for generating a status indicating whether or not a pattern expectation and a detection result match with each other according to the first modification.

FIG. 14 is a view illustrating one example of a configuration of a status generator according to a second modification.

DETAILED DESCRIPTION

According to one embodiment of the present disclosure, there is provided a magnetic disk device which is capable of improving the reliability of data write, an adjusting method, and a manufacturing method.

According to one embodiment, there is provided an adjusting method for a magnetic disk device including a disk, a head that writes data on the disk, a controller circuit that outputs write data and a control signal related to the write data, and an integrated circuit that outputs a write current to the head. The method includes adding a delay to a timing of polarity inversion of one bit of the write data or the control signal, outputting the write data and the control signal added with the delay from the controller circuit to the integrated circuit, outputting from the integrated circuit to the head, the write current having a current value that is changed at one of timings of polarity inversion of the write data, according to the control signal, and adjusting a deviation between the write data and the control signal, based on the output write current.

Hereinafter, exemplary embodiments will be described with reference to the drawings. It should be noted that the drawings are merely examples and are not intended to limit the scope of the present disclosure.

First Embodiment

Figure 1:
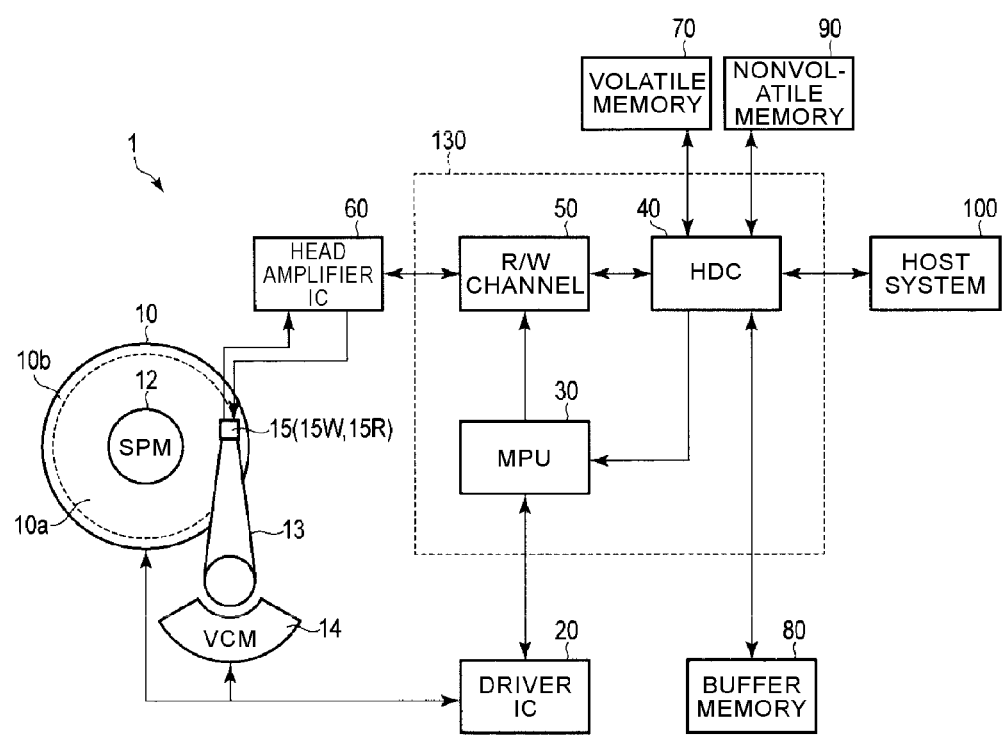
FIG. 1 is a block diagram illustrating a configuration of a magnetic disk device according to a first embodiment.

FIG. 1 is a block diagram illustrating the configuration of a magnetic disk device 1 according to a first embodiment.

The magnetic disk device 1 according to the present embodiment is, for example, a hard disk drive (HDD). The magnetic disk device 1 has a function of changing a part of level of a write current from that of a normal write current. This function is called, for example, a data dependent write (DDW), a pattern dependent write (PDW), or the like. For the convenience of description, this function will be referred to as DDW below.

The magnetic disk device 1 includes a head-disk assembly (HDA) described later, a driver IC 20, a head amplifier integrated circuit (hereinafter, referred to as a head amplifier IC or a preamplifier) 60, a volatile memory 70, a buffer memory (buffer) 80, a nonvolatile memory 90, and a system controller 130 which is a one-chip integrated circuit. The magnetic disk device 1 is connected to a host system (host) 100.

The HDA includes a magnetic disk (hereinafter, abbreviated as a disk) 10, a spindle motor (SPM) 12, an arm 13 on which a head 15 is mounted, and a voice coil motor (VCM) 14. The disk 10 is rotated by the spindle motor 12. The arm 13 and the VCM 14 make up an actuator. The actuator controls movement of the head 15 mounted on the arm 13 to a target position on the disk 10 by driving the VCM 14. Two or more disks 10 and two or more heads 15 may be provided.

The disk 10 has a recording area allocated as a recording area 10a for user data and a system area 10b in which information required for system management is written.

The head 15 includes a slider as a main body, and a write head 15W and a read head 15R which are mounted on the slider. The write head 15W writes data on the disk 10. The read head 15R reads data recorded on a data track on the disk 10.

The driver IC 20 controls driving of the SPM 12 and the VCM 14 under control of the system controller 130 (more specifically, an MPU 30 described later).

The volatile memory 70 is a semiconductor memory whose stored data are lost when supply of power thereto is cut off. The volatile memory 70 stores data and the like required for processing in each part of the magnetic disk device 1. The volatile memory 70 is, for example, a Dynamic Random Access Memory (DRAM) or a Synchronous Dynamic Random Access Memory (SDRAM).

The buffer memory 80 is a semiconductor memory which temporarily stores data and the like transmitted/received between the magnetic disk device 1 and the host 100. The buffer memory 80 may be integrated with the volatile memory 70. The buffer memory 80 is, for example, a Dynamic Random Access Memory (DRAM), a Static Random Access Memory (SRAM), an SDRAM, a Ferroelectric Random Access Memory (FeRAM) or a Magnetoresistive Random Access Memory (MRAM).

The nonvolatile memory 90 is a semiconductor memory whose stored data are not lost even when supply of power thereto is cut off. The nonvolatile memory 90 is, for example, a Flash Read Only Memory (FROM) of a NOR type or a NAND type.

The system controller (controller) 130 includes a large scale integrated circuit (LSI) called a System-on-a-Chip (SoC) in which a plurality of elements are integrated on a single chip, for example. The system controller 130 includes a microprocessor (MPU) 30, a hard disk controller (HDC) 40 and a read/write (R/W) channel 50. The MPU 30, the HDC 40 and the R/W channel 50 each include registers (not illustrated).

The MPU 30 is a main controller which controls each part of the magnetic disk device 1. The MPU 30 controls the VCM 14 via the driver IC 20 and executes servo control for positioning the head 15. In addition, the MPU 30 controls an operation of write data in the disk 10 and selects a save destination of write data transferred from the host 100. The MPU 30 executes processing based on a firmware.

The HDC 40 controls data transfer between the host 100 and the R/W channel 50 according to an instruction from the MPU 30.

The R/W channel 50 executes a signal processing of read data and write data. The R/W channel 50 has a circuit or function for measuring signal quality of the read data.

In the write processing, the head amplifier IC (preamplifier) 60 outputs a write current corresponding to the write data output from the R/W channel 50 to the write head 15W. In the read processing, the head amplifier IC 60 amplifies a read signal read by the read head 15R and outputs the amplified signal to the read/write (R/W) channel 50. The head amplifier IC 60 includes a register and a register I/F (not illustrated) for accessing this register from the outside.

Hereinafter, in the system controller 130 (the MPU 30, the HDC 40 and the R/W channel 50) and the head amplifier IC 60, a system which writes data input from the host 100 in the disk 10 may be referred to as a write system.

Figure 2:
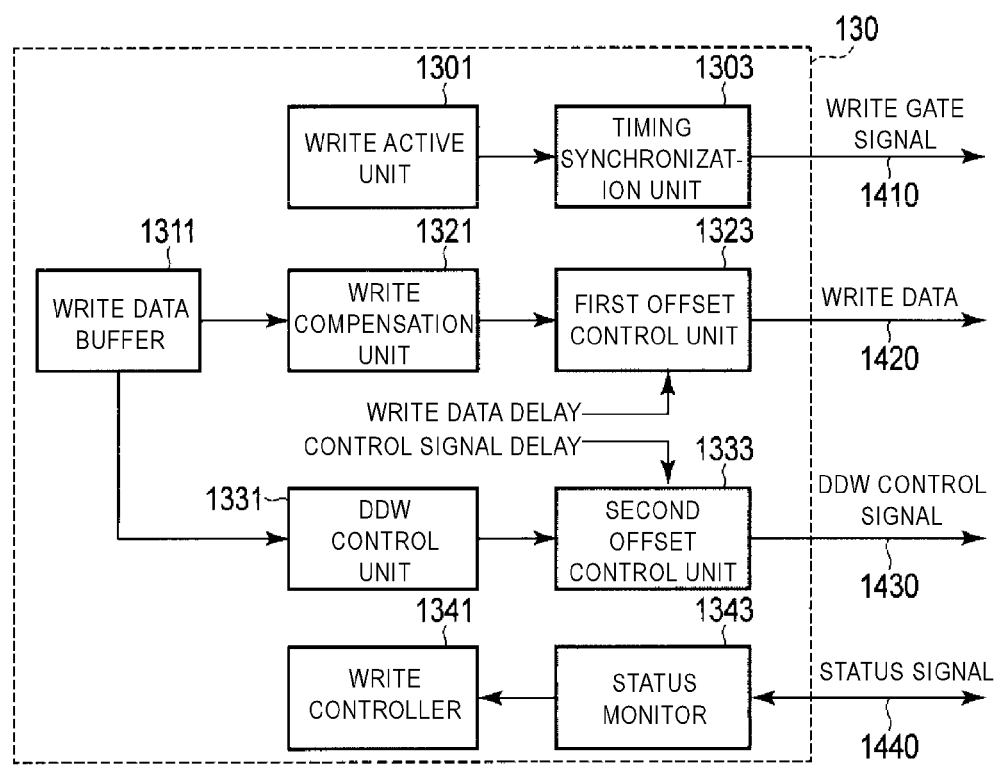
FIG. 2 is a schematic view illustrating a configuration example of a write system in a system controller.

FIG. 2 is a schematic view illustrating a configuration example of the write system in the system controller 130. Although FIG. 2 illustrates the configuration that is separately described for each signal path, parts thereof may be formed in combination or all parts may be integrally formed.

The system controller 130 includes, as a write system, a write active unit 1301, a timing synchronization unit 1303, a write data buffer 1311, a write compensation unit 1321, a first offset control unit 1323, a DDW control unit 1331, a second offset control unit 1333, a write controller 1341 and a status monitor 1343. In the system controller 130, these units include circuits and are provided in one or both of the HDC 40 and the R/W channel 50. In addition, the operations of these units are controlled by the MPU 30 or the HDC 40. Here, the write controller 1341 may be executed by the MPU 60 based on a firmware. Further, the write data buffer 1311 may be provided in the buffer memory 80.

The system controller 130 is connected with the head amplifier IC 60 via a write gate signal interface (I/F) 1410, a write data I/F 1420, a DDW control signal I/F 1430 and a status signal I/F 1440. These I/Fs respectively may have dedicated signal lines or may use the same signal line. As will be described in detail later, a status signal is generated by the head amplifier IC 60. The status signal is exchanged between the head amplifier IC 60 and the system controller 130 via the status signal I/F 1440. Further, the status signal may be exchanged between the head amplifier IC 60 and the system controller 130 via a register I/F (not illustrated) or the like.

The write active unit 1301 is electrically connected to the timing synchronization unit 1303. The write active unit 1301 outputs a write gate signal to the timing synchronization unit 1303. For example, the write active unit 1301 outputs a write gate signal for activating the write processing to the timing synchronization unit 1303 under the control of the MPU 30.

The timing synchronization unit 1303 is electrically connected to the head amplifier IC 60. The timing synchronization unit 1303 outputs the write gate signal, which is input from the write active unit 1301, in synchronization with data such as the write data, to the head amplifier IC 60 via the write gate signal I/F 1410.

The write data buffer 1311 is electrically connected to the write compensation unit 1321 and the DDW control unit 1331. The write data buffer 1311 temporarily holds the write data input from the host 100 and outputs the write data to the write compensation unit 1321 and the DDW control unit 1331.

The write compensation unit 1321 is electrically connected to the first offset control unit 1323. The write compensation unit 1321 subjects the write data input from the write data buffer 1311 to write compensation processing and outputs the write-compensated write data to the first offset control unit 1323.

The write compensation processing employs a process of shifting the timing of polarity inversion of data (rising of signal and falling of signal) in advance by a time of Non Linear Transition Shift (NLTS). NLTS refers to the phenomenon that a demagnetizing field generated by preceding data written on the disk 10 strengthens or weakens a recording magnetic field generated from the write head 15W, so that a magnetization inversion point is shifted in front of or behind the head 15 in the traveling direction of the head 15 from a position at which the magnetization inversion point should be originally formed.

FIG. 3 is a view for illustrating one example of the write compensation processing. In FIG. 3, line (a) illustrates one example of a data pattern of write data subjected to no write compensation processing. In FIG. 3, line (b) illustrates one example of a data pattern of write data subjected to the write compensation processing. In lines (a) and (b) of FIG. 3, the data pattern of the write data corresponds to a bit pattern, rises at the timing when a bit becomes "1," and falls at the timing when the bit becomes "0." A horizontal axis represents time t. In the following description, in some cases, a direction of the horizontal axial direction may be referred to as back or lagging, and a direction opposite to the horizontal axial direction may be referred to as front or leading. Further, the bit interval Bw of one bit data is assumed to have a bit width of 1T. In FIG. 3, delay D31 is less than delay D32.

In carrying out the write compensation processing, the write compensation unit 1321 adds a delay (or delay time) (hereinafter, referred to as WPC delay) to the timing of polarity inversion of a data pattern according to the condition of polarity inversion of previous and next data patterns. The optimal value of the WPC delay may vary depending on the characteristics of the write system of the magnetic disk device 1, the recording density of the disk 10 and the like, and may be determined by a result of measurement of a bit error rate (BER) or the like. Therefore, depending on the situation, the write compensation unit 1321 adds a variable size WPC delay in a predetermined range, for example, a range of 0% to 50% with respect to the bit interval Bw of one bit data, to the timing of polarity inversion of the data pattern. For example, the write compensation unit 1321 adds a certain length of the WPC delay D31 to the timing of rising of the next data pattern of the data pattern having a short inversion interval, and adds the WPC delay D32 longer than WPC delay D31 to the timing of rising of the next data pattern of the data pattern having a long inversion interval. Although one example of the write compensation processing of adding a WPC delay to the timing of rising of a data pattern has been described above, the write compensation unit 1321 may add the WPC delay at the timing of falling of the data pattern in the write compensation processing.

Referring back to FIG. 2, the first offset control unit 1323 is electrically connected to the head amplifier IC 60. The first offset control unit 1323 adds a delay (hereinafter, referred to as a write data delay) to the write data input from the write compensation unit 1321 so as to be synchronized with a DDW control signal to be described later, and outputs the write data to the head amplifier IC 60 via the write data I/F 1420.

The DDW control unit 1331 is electrically connected to the second offset control unit 1333. In response to the write data input from the write data buffer 1311, the DDW control unit 1331 generates a DDW control signal which instructs a timing at which a value of a write current is changed, and outputs the generated DDW control signal to the second offset control unit 1333.

The second offset control unit 1333 adds a delay (hereinafter, referred to as a control signal delay) to the DDW control signal input from the DDW control unit 1331 so as to be synchronized with the write data output from the first offset control unit 1323, and outputs the DDW control signal to the head amplifier IC 60 via the DDW control signal I/F 1430.

By setting the write data delay and the control signal delay, the first offset control unit 1323 and the second offset control unit 1333 synchronize the write data and the DDW control signal with each other in a state where a deviation (phase skew) for each bit between the write data and the DDW control signal is generated. When the write compensation processing is executed, the first offset control unit 1323 and the second offset control unit 1333 adjust the write data delay and the control signal delay in order to synchronize the write data and the DDW control signal in a state where a phase skew including a deviation generated by the write compensation processing is generated. In addition, the write data and the DDW control signal have different arrival times taken from the R/W channel 50 to the head amplifier IC 60 depending on a length of a connection line connecting the R/W channel 50 and the head amplifier IC 60, a circuit configuration of an output terminal of the R/W channel 50 and an input terminal of the head amplifier IC 60, etc. Therefore, by setting the write data delay and the control signal delay, the first offset control unit 1323 and the second offset control unit 1333 synchronize the write data and the DDW control signal with each other in a state where a deviation (bit skew) for compensating for a difference in arrival time to the head amplifier IC 60 between the write data and the DDW control signal is generated between the write data and the DDW control signal. The first offset control unit 1323 and the second offset control unit 1333 may be sometimes collectively referred to as an adjustment unit. In addition, the first offset control unit 1323 and the second offset control unit 1333 may be integrally formed. In addition, for the sake of convenience of explanation, it may be sometimes expressed that the phase skew and the bit skew are added to one of the write data and the DDW control signal.

The write controller 1341 is electrically connected to the status monitor 1343. Based on a status signal input from the status monitor 1343, the write controller 1341 executes the success/failure determination as to whether or not DDW processing, which will be described later, is being executed as set, etc. In addition, based on the status signal input from the status monitor 1343, the write controller 1341 generates a profile indicating a state of synchronization of the write data with the DDW control signal or other signals, etc. The write controller 1341 may also output a signal to the status monitor 1343 based on a result of the success/failure determination of the DDW processing and the generated profile. The write controller 1341 sets a phase skew and a bit skew based on the generated profiles. In addition, the write controller 1341 may output the status signal to the host 100. In this case, the host 100 generates a profile based on the status signal. Therefore, the write controller 1341 may acquire the profile generated by the host 100.

The status monitor 1343 is electrically connected to the head amplifier IC 60. The status monitor 1343 monitors the DDW processing by referring to the status signal input from the head amplifier IC 60 via the status signal I/F 1440, and outputs the status signal to the write controller 1341. In addition, the status monitor 1343 may output information, which is used to generate the status signal and is input from the write controller 1341 or the like, to the head amplifier IC 60 via the status signal I/F 1440.

FIG. 4 is a schematic view illustrating a configuration example of a write system in the head amplifier IC 60.

The head amplifier IC 60 includes, as a write system, a write sequencer 601, a data buffer 603, a write current driver 605 and a status generator 607. In the head amplifier IC 60, these components are implemented as circuits. In addition, the operations of these components are controlled by the MPU 30 or the HDC 40.

The write sequencer 601 is electrically connected to the data buffer 603 and the write current driver 605. The write sequencer 601 controls the data buffer 603 and the write current driver 605 according to a write gate signal input from the timing synchronization unit 1303 of the system controller 130 via the write gate signal I/F 1410. For example, upon receiving the write gate signal, the write sequencer 601 outputs a control signal for activating the write processing to the write current driver 605 and the data buffer 603.

The data buffer 603 is electrically connected to the write current driver 605 and the status generator 607. The data buffer 603 temporarily holds the write data input from the first offset control unit 1323 via the write data I/F 1420 and the DDW control signal input from the second offset control unit 1333 via the DDW control signal I/F 1430. The data buffer 603 outputs the write data and the DDW control signal to the write current driver 605 in response to the control signal input from the write sequencer 601. The data buffer 603 outputs the write data, the DDW control signal and their associated information, as a control signal, to the status generator 607.

The write current driver 605 is electrically connected to the head 15 (in particular, the write head 15W) and the status generator 607. In addition, the write current driver 605 is electrically connected to the system controller 130 via the DDW control signal I/F 1430. The write current driver 605 outputs a write current corresponding to the write data input from the data buffer 603, to the head 15 in response to the control signal input from the write sequencer 601. In addition, the write current driver 605 executes the DDW processing based on the write data input from the data buffer 603 and the DDW control signal input from the system controller 130. The DDW processing employs a process of changing the level of a write current so that the write current level differs from that of a normal write. In the following description, generation of the DDW control signal in the system controller 130 (which includes the HDC 40 and the R/W channel 50) will be referred to as an R/W channel mode. In addition, the DDW processing based on the DDW control signal generated by the system controller 130 will be referred to as a DDW process in the R/W channel mode. The write current driver 605 outputs a control signal indicating an output result of the write current, a control signal indicating an execution result of the DDW processing, etc. to the status generator 607.

The status generator 607 is electrically connected to the status monitor 1343 of the system controller 130 via the status signal I/F 1440. The status generator 607 generates information (status) indicating the execution result of the DDW processing from the write data, the DDW control signal, the control signal, etc. input from the data buffer 603 and the write current driver 605. The status generator 607 outputs the generated status, as a status signal, to the status monitor 1343 via the status signal I/F 1440.

FIG. 5 is a view for illustrating one example of the DDW processing. In FIG. 5, line (a) illustrates one example of a write current corresponding to the write data at the time of normal write. In FIG. 5, line (b) illustrates one example of a write current corresponding to the write data at the time of DDW. In lines (a) and (b) of FIG. 5, a data pattern of the write current corresponds to a bit pattern. In addition, a polarity inversion timing of the write current corresponds to a polarity inversion timing of the write data.

For example, at the time of normal write, the head amplifier IC 60 outputs, to the head 15 (in particular, the write head 15W), a write current on which an overshoot current is superimposed at the timing when the polarity of the write current is inversed. At the time of DDW, the head amplifier IC 60 superimposes an overshoot current larger or smaller than the overshoot current in the normal write (hereinafter, referred to as a normal overshoot current) on the write current at a specific one of polarity inversion timings at which the overshoot current is superimposed at the time of normal write, and outputs this write current to the head 15.

In the example illustrated in FIG. 5, in the normal write, the head amplifier IC 60 superimposes an overshoot current of a certain level on the write current at the timing of polarity inversion of the write current. In the DDW processing, the head amplifier IC 60 superimposes an overshoot current, which is larger than the normal overshoot current, on the write current at timings Tb1, Tb2 and Tb3 of polarity inversion with a bit interval of 1 bit. Therefore, in FIG. 5, at the timings Tb1, Tb2 and Tb3, a value of the write current in the DDW is larger than a value of the write current in the normal write. For example, by superimposing an overshoot current, which is larger than the normal overshoot current, on the write current at the next polarity inversion timing of the data pattern having a short inversion interval of the write current by the DDW processing, it is possible to write data in the disk 10 with high accuracy. In the following description, superimposing an overshoot current, which is larger than the normal overshoot current, on the write current at a certain timing by the DDW processing is called a "boost."

In the DDW processing in the R/W channel mode, the head amplifier IC 60 performs a boost (DDW processing) for the write current based on the DDW control signal input from the system controller 130 and the write data input from the data buffer 603. The head amplifier IC 60 compares the write data with the DDW control signal input from the system controller 130 and determines, based on a result of the comparison, whether the DDW control signal rises or falls at the timing of polarity inversion of the write data, i.e., detects a logical value of the DDW control signal. In this way, detecting the rising and falling state of one of two signals at a timing of the other signal may be sometimes referred to as "the other signal hits the one signal." In addition, in the following description, the fact that a signal rises and has a high (H) level may be sometimes referred to as "active" and the fact that a signal falls and has a low (L) level may be sometimes referred to as "inactive." When the DDW control signal is active at a specific one of timings of polarity inversion of the write data, the head amplifier IC 60 executes boost for the write current at this timing.

FIG. 6 is a view for illustrating one example of the DDW processing in an R/W channel mode when no write compensation processing is executed. In FIG. 6, it is assumed that a bit interval in the write data and the DDW control signal is 1T. In FIG. 6, line (a) illustrates one example of a data pattern corresponding to a bit pattern. In FIG. 6, line (b) illustrates one example of a data pattern of the DDW control signal. In FIG. 6, the head amplifier IC 60 is set so as to execute a boost at any timing of polarity inversion of the write data.

In the examples illustrated in FIG. 6, the head amplifier IC 60 detects that the DDW control signal is inactive at timings Tna1, Tna2, Tna3 and Tna4 of polarity inversion of the write data, and detects that the DDW control signal is active at timings Tb1, Tb2 and Tb3 of polarity inversion of the write data. Therefore, the head amplifier IC 60 boosts the write current corresponding to the write data at the timings Tb1, Tb2 and Tb3 of polarity inversion of the write data. For example, like the write current in DDW illustrated in line (b) of FIG. 5, the write current driver 605 boosts the write current corresponding to the write data at the timings Tb1, Tb2 and Tb3.

When the write compensation processing is not executed and when the write data of one bit interval is detected by the DDW control signal at a timing of rising of the write data, the maximum timing margin may be obtained by adding a phase skew, which is half the bit interval, to the DDW control signal. In the examples illustrated in FIG. 6, at the timing Tb1, the system controller 130 sets a phase skew ½T, which is half the one bit interval 1T of the write data, between the data pattern of the write data and the data pattern of the DDW control signal. On the other hand, when the write compensation processing is executed, it is necessary to adjust the phase skew set between the write data and the DDW control signal to the optimal value according to a value of the DWC delay added to the write data. Details of a method for adjusting the phase skew when this write compensation processing is executed will be described later.

Figure 7:
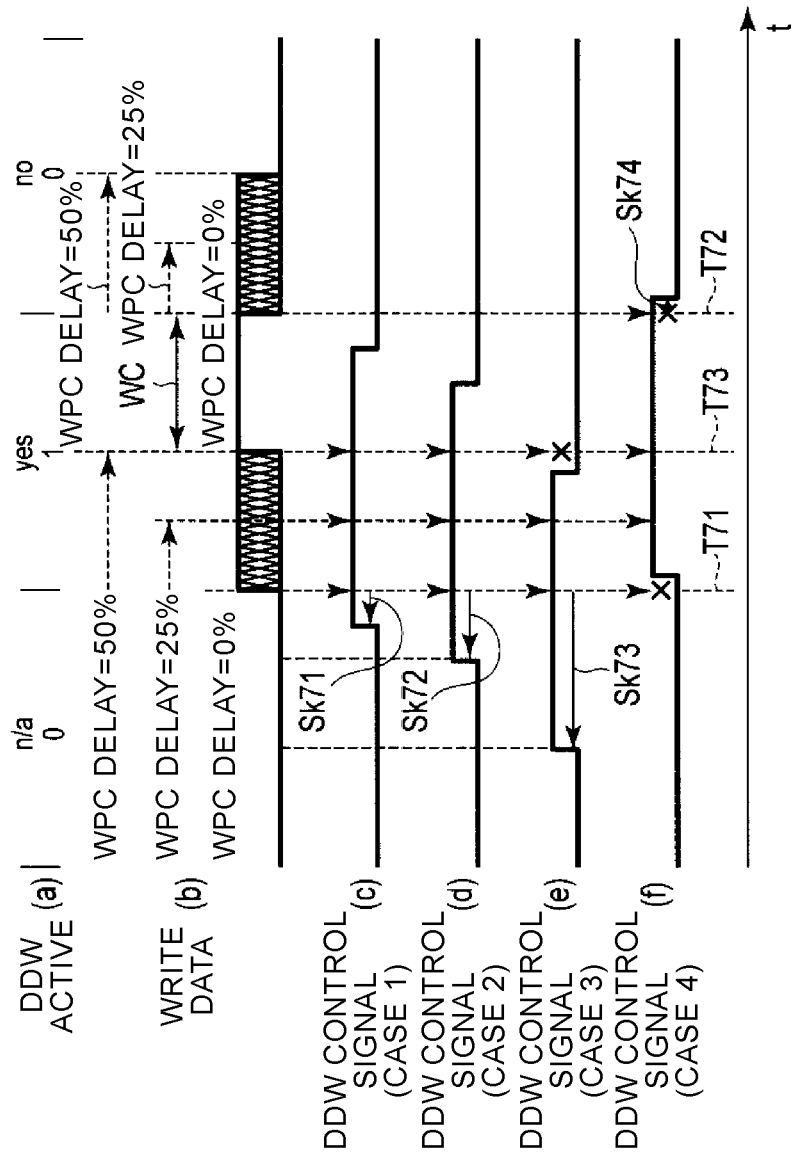
FIG. 7 is a view illustrating one example of write data subjected to write compensation processing and a DDW control signal added with a phase skew.

FIG. 7 is a view illustrating one example of write data subjected to write compensation processing and a DDW control signal to which a phase skew is added. In FIG. 7, it is assumed that a bit interval in the write data and the DDW control signal is 1T. In FIG. 7, part (a) illustrates one example of DDW active indicator indicating whether the DDW processing is active or inactive. In part (a) of FIG. 7, "n/a" (not applicable) indicates an interval which cannot be used, "yes" indicates an interval in which the DDW processing is active, and "no" indicates an interval in which the DDW processing is inactive. In FIG. 7, part (b) illustrates one example of the write data subjected to the write compensation processing. In part (b) of FIG. 7, as the write compensation processing, in the write data, one of WPC delays in a range of 0% to 50% is added to one bit interval 1T. In FIG. 7, part (c) illustrates a DDW control signal of Case 1 where a rising timing is deviated by a phase skew Sk71 from a timing of rising of the write data with a write compensation delay 0%. In FIG. 7, part (d) illustrates a DDW control signal of Case 2 where a rising timing is deviated by a phase skew Sk72 from the timing of rising of the write data with the write compensation delay 0%. In FIG. 7, part (e) illustrates a DDW control signal of Case 3 where a rising timing is deviated by a phase skew Sk73 from the timing of rising of the write data with the write compensation delay 0%. In FIG. 7, part (f) illustrates a DDW control signal of Case 4 where a falling timing is deviated by a phase skew Sk74 from a timing of falling of the write data with the write compensation delay 0%. In the DDW control signals in parts (c) to (f) of FIG. 7, an H level is active and an L level is inactive. In FIG. 7, the head amplifier IC 60 is set so as to execute a boost at a timing of rising of the write data, for example, at a timing when the DDW active is switched to "yes."

At a rising timing T71 of the write data when the WPC delay has the minimum value of 0%, the head amplifier IC 60 detects that the DDW control signal is active in Cases 1 to 3, and detects that the DDW control signal is inactive in Case 4. In addition, at a falling timing T72 of the write data when the WPC delay has the minimum value of 0%, the head amplifier IC 60 detects that the DDW control signal is inactive in Cases 1 to 3 and is active in Case 4.

At a rising timing T73 of the write data when the WPC delay has the maximum value of 50%, the head amplifier IC 60 detects that the DDW control signal is active in Cases 1, 2 and 4. At the rising timing T73 of the write data when the WPC delay has the maximum value of 50%, the head amplifier IC 60 detects that the DDW control signal is inactive in Case 3.

In the examples illustrated in FIG. 7, when the WPC delay has any value within the range of 0% to 50%, the head amplifier IC 60 may execute a boost at the rising timing of the write data with the DDW control signals of Cases 1 and 2. When the WPC delay has the maximum value of 50%, since the timing is too early for the phase skew Sk73 for the DDW control signal in Case 3, the head amplifier IC 60 cannot boost at the rising timing of the write data. In addition, when the WPC delay has the minimum value of 0%, since the timing is too late for the phase skew Sk74 for the DDW control signal in Case 4, the head amplifier IC 60 cannot boost at the rising timing of the write data and boosts at the falling timing of the write data. Therefore, like the DDW control signals of Cases 1 and 2, even when the WPC delay has any value in the range of 0 to 50%, it is necessary to adjust the phase skew to be added to the DDW control signal so that boost may be executed.

In the DDW processing in the R/W channel mode, the write data WC added with a WPC delay of the most severe range (hereinafter, referred to as the worst case) of the specified ranges is used to adjust the phase skew to be added to the DDW control signal. By executing the DDW processing using the DDW control signal to which the phase skew adjusted as described above is added, even when the WPC delay to be added to the write data has any value within a settable range, a boost may be performed for a write current at a desired timing. The write data added with the WPC delay of the worst case may be any write data with the shortest inversion interval. In the examples illustrated in FIG. 7, the write data WC added with the WPC delay of the worst case is added with the maximum value of 50% of the WPC delay at the rising timing and with the minimum value of 0% of the WPC delay at the falling timing.

Figure 8:
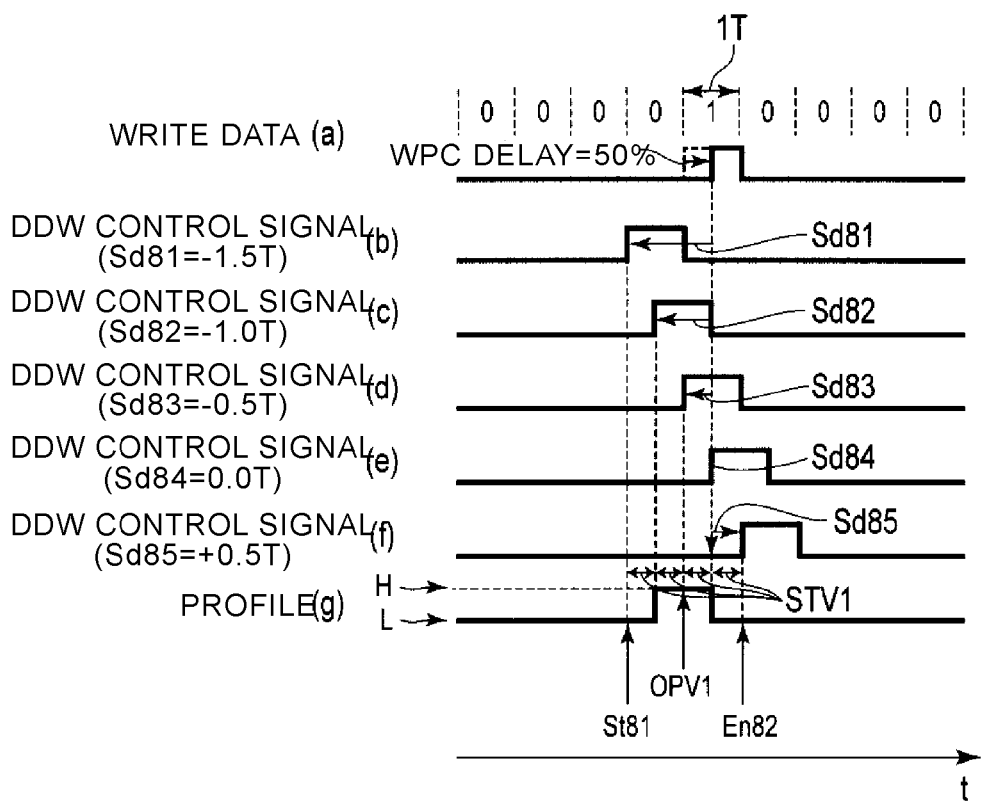
FIG. 8 is a view illustrating one example of a method for adjusting the phase skew in the R/W channel mode.

FIG. 8 is a view illustrating one example of a method for adjusting a phase skew in the R/W channel mode. FIG. 8 illustrates a process of increasing a delay to be added to the DDW control signal (hereinafter, referred to as a skew delay) by a constant value from a start value St81 to an end value En82 in order to detect the optimal value of a phase skew in the R/W channel mode, and detecting whether the DDW control signal is active or inactive at a timing of rising of the write data added with the WPC delay of the worst case (hereinafter, simply referred to as the worst case write data). In FIG. 8, all bit intervals of the write data and the DDW control signal are 1T. In addition, all inversion intervals of the DDW control signal are 1T. In FIG. 8, the head amplifier IC 60 is set so as to execute a boost at the timing of rising of the write data. Here too, in the DDW control signals, an H level is active and an L level is inactive.

In FIG. 8, line (a) illustrates a data pattern of write data added with the worst case WPC delay, for example, a WPC delay of 50% of one bit interval 1T, at a rising timing. In FIG. 8, line (b) illustrates a DDW control signal in which the same rising timing as the worst case write data is shifted by a skew delay Sd81 (=−1.5T) which is the start value. In FIG. 8, line (c) illustrates a DDW control signal in which the same rising timing as the worst case write data is shifted by a skew delay Sd82 (=−1.0T). In FIG. 8, line (d) illustrates a DDW control signal in which the same rising timing as the worst case write data is shifted by a skew delay Sd83 (=−0.5T). In FIG. 8, line (e) illustrates a DDW control signal which rises at the same rising timing as the worst case write data (a skew delay Sd84=0). In FIG. 8, line (f) illustrates a DDW control signal in which the same rising timing as the worst case write data is shifted by a skew delay Sd85 (=0.5T) which is the end value. In FIG. 8, line (g) illustrates a profile indicating whether a DDW control signal in which each skew delay is added to the rising timing of the write data is active or inactive.

The system controller 130 adds the skew delay shifted at intervals of less than 1 bit to the DDW control signal stepwise from the start value to the end value. The system controller 130 outputs the DDW control signal added stepwise with the skew delay and the worst case write data to the head amplifier IC 60, respectively. The head amplifier IC 60 detects whether the DDW control signal is active or inactive at a rising timing of polarity inversion timings of the worst case write data for each DDW control signal added stepwise with the skew delay, for example. From a detection result corresponding to each skew delay, the head amplifier IC 60 generates a status indicating whether the DDW control signal is active or inactive at the timing of polarity inversion of the worst case write data, and outputs the generated status, as a status signal, to the system controller 130. The system controller 130 generates a profile indicating a relationship between the skew delay and the status indicating whether the DDW control signal is active or inactive. The system controller 130 acquires the midpoint of skew delays of the interval in which it is detected that the DDW control signal is active in the generated profile, as the optimal value of the skew delay. The system controller 130 sets the acquired optimal value as a phase skew.

In the examples illustrated in FIG. 8, first, the system controller 130 outputs the DDW control signal added with the skew delay Sd81 as the start value and the worst case write data to the head amplifier IC 60. The head amplifier IC 60 detects that the DDW control signal added with the skew delay Sd81 is inactive at the rising timing of the worst case write data. At the rise timing of the worst case write data, the head amplifier IC 60 generates a status indicating that the DDW control signal added with the skew delay Sd81 is inactive, and outputs the generated status, as a status signal, to the system controller 130.

Next, the system controller 130 outputs the DDW control signal added with the skew delay Sd82 obtained by adding a step value STV1 to the skew delay Sd81 and the worst case write data to the head amplifier IC 60. The head amplifier IC 60 detects that the DDW control signal added with the skew delay Sd82 is active at the rising timing of the worst case write data. At the rising timing of the worst case write data, the head amplifier IC 60 generates a status indicating that the DDW control signal added with the skew delay Sd82 is active, and outputs the generated status, as a status signal, to the system controller 130.

Similarly, the system controller 130 outputs the DDW control signals added stepwise with the skew delays Sd83 and Sd84 and the skew delay Sd85 (the end value) increased by the step value STV1 and the worst case write data to the head amplifier IC 60, respectively. The head amplifier IC 60 detects that the DDW control signals added with the skew delays Sd83 and Sd84 are active at the rising timing of the worst case write data, respectively. The head amplifier IC 60 detects that the DDW control signal added with the skew delay Sd85 (the end value) is inactive at the rising timing of the worst case write data. At the rising timing of the worst case write data, the head amplifier IC 60 generates a status indicating that the DDW control signals added with the skew delays Sd83 and Sd84 are active, and outputs the generated status, as a status signal, to the system controller 130, respectively. In addition, at the rising timing of the worst case write data, the head amplifier IC 60 generates a status indicating that the DDW control signal added with the skew delay Sd85 (the end value) is inactive, and outputs the generated status, as a status signal, to the system controller 130.

From the status corresponding to the DDW control signal added with each skew delay, the system controller 130 generates a profile indicating a relationship between the skew delay and the status indicating whether the DDW control signal is active or inactive at the rising timing of the worst case write data. The system controller 130 acquires the midpoint Sd83 (=−0.5T) of skew delays of the interval in which it is detected that the DDW control signal is active in the generated profile, as the optimal value OPV1 of the skew delay. The system controller 130 sets the acquired optimal value as a phase skew.

Figure 9:
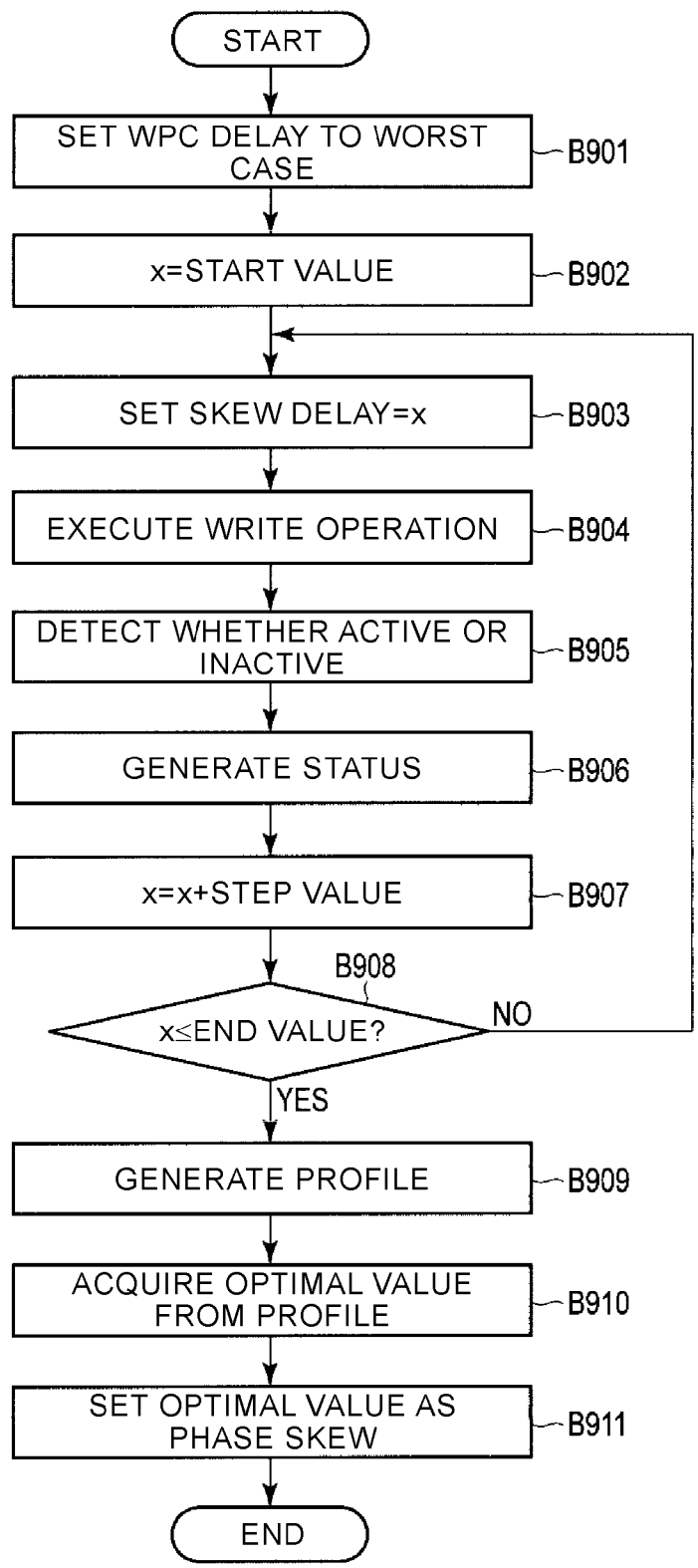
FIG. 9 is a flow chart of a method for adjusting the phase skew in the R/W channel mode.

FIG. 9 is a flow chart of a method for adjusting a phase skew in the R/W channel mode.

The system controller 130 sets a WPC delay to the worst case (B901) and sets x to the start value (B902). The system controller 130 sets a skew delay to x (B903).

The system controller 130 executes a write operation (B904). At this time, the system controller 130 outputs a write gate signal for making the write processing active, write data added with the worst case WPC delay, and a DDW control signal added with a set skew delay x (the start value in the example) to the head amplifier IC 60.

At a timing of polarity inversion of the write data input from the system controller 130, the head amplifier IC 60 detects whether the DDW control signal added with the set skew delay is active or inactive (B905). The head amplifier IC 60 generates a status from a result of the detection (B906). The head amplifier IC 60 outputs the generated status, as a status signal, to the system controller 130.

The system controller 130 adds a step value to the skew delay (B907) and determines whether or not the skew delay has reached an end value (B908). When it is determined that the skew delay has not reached the end value (NO in B908), the system controller 130 returns to the operation of B903. When it is determined that the skew delay has reached the end value (YES in B908), the system controller 130 generates a profile indicating a relationship between the skew delay and the status indicating whether the DDW control signal is active or inactive at a rising timing of the worst case write data, from the status input from the head amplifier IC 60 (B909). The system controller 130 acquires the optimal value of the skew delay from the generated profile (B910), sets the acquired optimal value as a phase skew (optimal phase skew) (B911), and ends the process.

Figure 10:
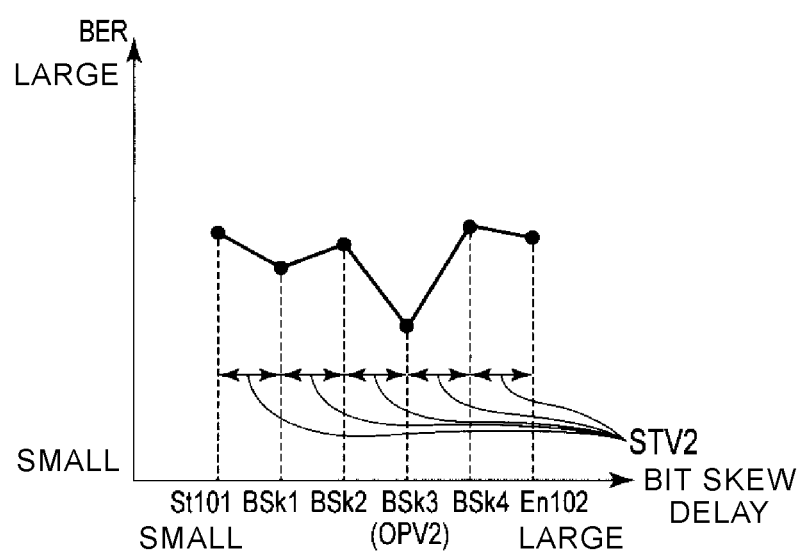
FIG. 10 is a graphical view illustrating one example of a method for adjusting a bit skew between write data and the DDW control signal.

FIG. 10 is a graphical view illustrating one example of a method for adjusting a bit skew between the write data and the DDW control signal. FIG. 10 illustrates a process of measuring a BER while increasing a delay to be added to the DDW control signal (hereinafter, referred to as a bit skew delay) by a constant value from a start value St101 to an end value En102 in order to detect the optimal value of the bit skew. In FIG. 10, a vertical axis represents a BER and a horizontal axis represents a bit skew delay.

After setting the phase skew as the optimal value, the system controller 130 adds the bit skew delay shifted at intervals of several bits to the DDW control signal stepwise from the start value to the end value. The system controller 130 outputs the DDW control signal added stepwise with the bit skew delay and the write data to the head amplifier IC 60, respectively. The head amplifier IC 60 outputs a write current, which is based on the write data input from the system controller 130 and the DDW control signal added stepwise with the bit skew delay, to the head 15. The system controller 130 measures the BER by writing data corresponding to this write current in the disk 10 through the head 15 and reading the written data. The system controller 130 measures the BER for each of the bit skew delays added stepwise to the DDW control signal. From a result of the measurement of BER corresponding to each bit skew delay, the system controller 130 generates a profile indicating a relationship between the bit skew delay and the measurement of BER. The system controller 130 acquires the bit skew delay corresponding to the smallest BER in the generated profile, as the optimal value. The system controller 130 sets the acquired optimal value as a bit skew.

In the example illustrated in FIG. 10, first, the system controller 130 outputs the DDW control signal added with the bit skew delay St101 as the start value and the write data to the head amplifier IC 60. The head amplifier IC 60 outputs a write current, which is based on the DDW control signal added with the bit skew delay St101 and the write data input from the system controller 130, to the head 15. The system controller 130 measures BER of data corresponding to this write current.

Next, the system controller 130 outputs the DDW control signal added with a bit skew delay BSk1 obtained by adding a step value STV2 to the bit skew delay St101 and the write data, to the head amplifier IC 60. The head amplifier IC 60 outputs a write current, which is based on the DDW control signal added with the bit skew delay BSk1 and the write data input from the system controller 130, to the head 15. The system controller 130 measures BER of data corresponding to this write current.

Similarly, the system controller 130 outputs DDW control signals, which are added stepwise with bit skew delays BSk2, BSk3 and BSk4 increased by the step value STV2 and the bit skew delay En102 (the end value), and write data, to the head amplifier IC 60, respectively. The head amplifier IC 60 outputs write currents, which are based on the DDW control signals added with the bit skew delays BSk2, BSk3, BSk4 and En102 and the write data input from the system controller 130, to the head 15, respectively. The system controller 130 measures BERs of data corresponding to these write currents, respectively.

From a result of the measurement of BER corresponding to each bit skew delay, the system controller 130 generates a profile indicating a relationship between the bit skew delay and the measurement of BER. The system controller 130 acquires the bit skew delay BSk3 corresponding to the smallest BER in the generated profile, as the optimal value OPV2. The system controller 130 sets the acquired optimal value as a bit skew (optimal bit skew).

Figure 11:
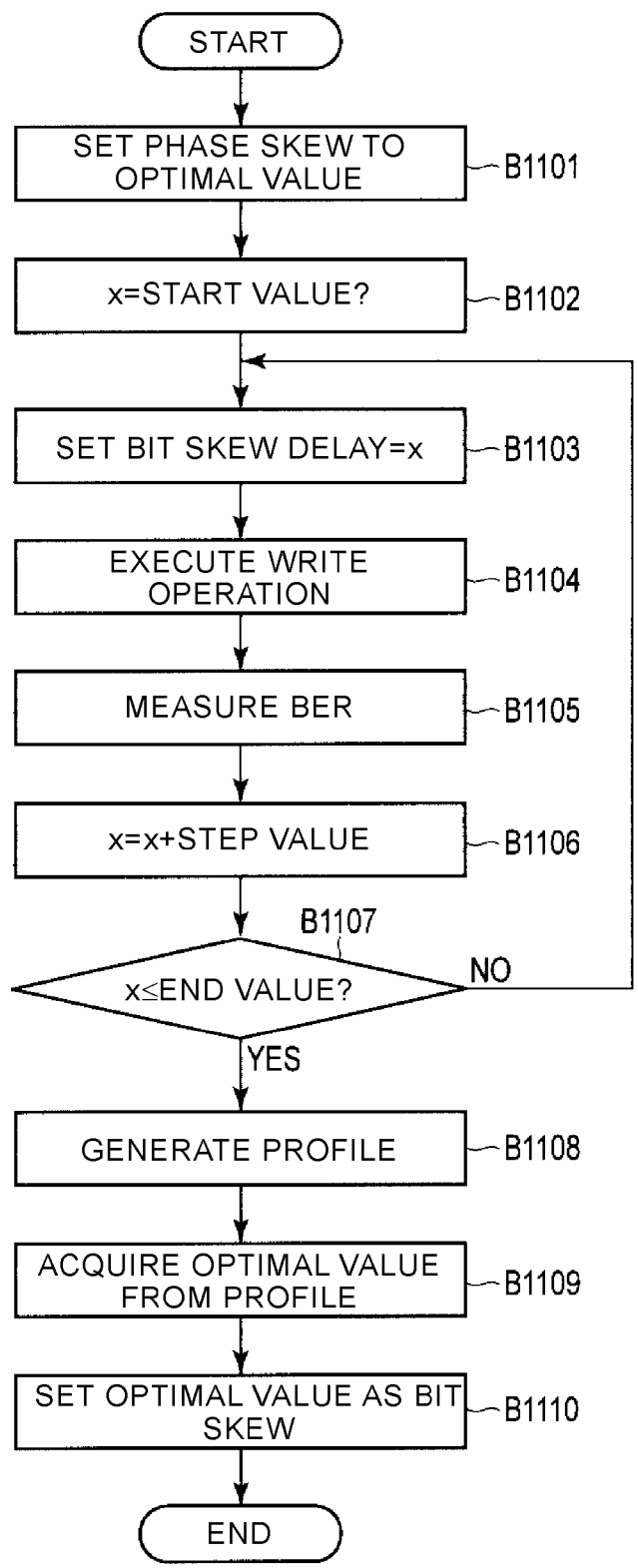
FIG. 11 is a flow chart illustrating one example of the method for adjusting the bit skew between the write data and the DDW control signal.

FIG. 11 is a flow chart illustrating one example of a method for adjusting a bit skew between the write data and the DDW control signal.

The system controller 130 sets a phase skew to the optimal value acquired by adjustment (B1101) and sets x to the start value (B1102). The system controller 130 sets a bit skew delay to x (B1103).

The system controller 130 executes a write operation (B1104). At this time, the system controller 130 outputs a write gate signal for making the write processing active, write data, and a DDW control signal added with the phase skew set as the optimal value by adjustment and the set bit skew delay x (the start value in the example), to the head amplifier IC 60.

The head amplifier IC 60 outputs a write current, which is based on the write data and the DDW control signal input from the system controller 130, to the head 15. The system controller 130 measures BER by reading data written by the head 15 in the disk 10 (B1105).

The system controller 130 adds a step value to the bit skew delay (B1106) and determines whether or not the bit skew delay has reached an end value (B1107). When it is determined that the bit skew delay has not reached the end value (NO in B1107), the system controller 130 returns to the operation of B1103. When it is determined that the bit skew delay has reached the end value (YES in B1107), the system controller 130 generates a profile indicating a relationship between the bit skew delay and the measurement of BER from a result of the measurement of BER (B1108). The system controller 130 acquires the optimal value of the bit skew delay from the generated profile (B1109), sets the acquired optimal value as a bit skew (B1110), and ends the process.

FIG. 12 is a flow chart illustrating one example of a method for manufacturing the magnetic disk device 1 according to the first embodiment. FIG. 12 illustrates a portion of a process of manufacturing the magnetic disk device 1.

After the process of manufacturing the magnetic disk device 1 is started, the system controller 130 adjusts a phase skew in the middle of the manufacturing process (B1201). The system controller 130 executes one example of the phase skew adjusting method illustrated in FIGS. 8 and 9 to adjust the phase skew generated between the write data and the DDW control signal. The system controller 130 adjusts the bit skew (B1202), executes another manufacturing process, and then ends the manufacturing process. In the operation of (B1202), the system controller 130 executes one example of the bit skew adjusting method illustrated in FIGS. 10 and 11 to adjust the bit skew generated between the write data and the DDW control signal.

In the magnetic disk device 1 according to the present embodiment, the system controller 130 generates a DDW control signal instructing a timing of executing a boost in the DDW processing, and outputs the generated DDW control signal and the write data subjected to write compensation processing to the head amplifier IC 60. The head amplifier IC 60 boosts at a specific timing according to the input DDW control signal and write data. The magnetic disk drive 1 may adjust a phase skew and a bit skew generated between the write data and the DDW control signal, for example, at a manufacturing stage. By adjusting the phase skew and the bit skew, the magnetic disk device 1 may execute the boost accurately at a desired timing in the DDW processing even when the write data is subjected to the write compensation processing. Therefore, the write characteristics of the magnetic disk device 1 may be improved. As a result, the reliability of the data write of the magnetic disk device 1 is improved.

Next, a magnetic disk device and a manufacturing method thereof according to modifications and another embodiment will be described. In such modifications and another embodiment, the same elements as the above-described embodiment are denoted by the same reference numerals or symbols and explanation of which will not be repeated.

(First Modification)

A magnetic disk device 1 according to a first modification is different from the magnetic disk device 1 according to the above-described embodiment in that the former generates a status indicating whether or not a bit pattern of write data corresponding to a desired timing of execution of a boost matches a bit pattern of write data corresponding to an actual timing of execution of the boost.

For example, the system controller 130 according to the first modification generates a bit pattern of write data corresponding to a desired timing of execution of a boost (hereinafter, referred to as a pattern expectation). The system controller 130 may store the pattern expectation in a memory, e.g., the volatile memory 70, the buffer memory 80, the nonvolatile memory 90 or the like. The system controller 130 outputs the pattern expectation to a preamplifier IC 60 (e.g., the status generator 607 of the preamplifier IC 60) via the status signal I/F 1440. For example, the system controller 130 generates a DDW control signal instructing to execute a boost at a timing corresponding to the pattern expectation (hereinafter, referred to as a test signal). The system controller 130 outputs a test signal added with a phase skew and a bit skew, which are adjusted to the optimal values, and write data added with a WPC delay, to the head amplifier IC 60. In the following description, a test signal added with a phase skew and a bit skew, which are adjusted to the optimal values, and write data added with a WPC delay may be sometimes collectively referred to as a test pattern.

Based on the test pattern, the head amplifier IC 60 executes DDW processing and acquires an actually boosted bit pattern as a result of detection. The head amplifier IC 60 compares the result of detection with the pattern expectation. The head amplifier IC 60 generates a status indicating whether or not the result of detection and the pattern expectation match with each other, and outputs the generated status to the system controller 130. The system controller 130 may adjust the phase skew and the bit skew according to a status signal input thereto.

In addition, the head amplifier IC 60 may temporarily hold the result of detection and the pattern expectation, in the form of a table, in the data buffer 603, the status generator 607 or the like. In addition, the head amplifier IC 60 may receive the pattern expectation from the system controller 130 every time a comparison is made between the bit pattern of the detection result and the pattern expectation.

FIG. 13 is a view illustrating one example of a method for generating a status indicating whether or not a pattern expectation and a detection result according to the first modification match with each other. In FIG. 13, each of a detection result 1 and a detection result 2 indicates a value of a bit pattern of write data corresponding to a timing at which a boost is actually executed in the head amplifier IC 60. In FIG. 13, the head amplifier IC 60 is set to execute a boost at any timing of polarity inversion of write data.

In the example illustrated in FIG. 13, the head amplifier IC 60 stores a bit pattern "100111" of the write data as the pattern expectation. Although the number of bits is 6 in the illustrated example, the number of bits may be fewer or more. For example, the head amplifier IC 60 executes a boost based on a certain test pattern and detects a bit pattern "100111" like the detection result 1. In this case, the head amplifier IC 60 compares the bit pattern of the detection result 1 with the pattern expectation and determines that the bit pattern and the pattern expectation match with each other. The head amplifier IC 60 determines that the boost is being executed as the pattern expectation, generates a signal indicating "OK" as a status, and outputs this status, as a status signal, to the system controller 130.

In addition, for example, the head amplifier IC 60 executes a boost based on another test pattern and detects a bit pattern "100101" like the detection result 2. In this case, the head amplifier IC 60 compares the bit pattern of the detection result 2 with the pattern expectation and determines that the bit pattern and the pattern expectation do not match with each other. The head amplifier IC 60 determines that the boost is not being executed as the pattern expectation, generates a signal indicating "No Good" or "NG" as a status, and outputs this status, as a status signal, to the system controller 130. The system controller 130 may adjust a phase skew and a bit skew according to the input status signal.

According to the first modification, the head amplifier IC 60 detects whether or not a boost is properly being executed and outputs a detection result to the system controller 130. Consequently, the system controller 130 may adjust a phase skew and a bit skew according to the input detection result.

(Second Modification)

A magnetic disk device 1 according to a second modification is different from the magnetic disk device 1 according to the above-described embodiment in that the former generates a status indicating whether or not the desired number of bits to be boosted matches the number of bits of write data that have been actually boosted.

FIG. 14 is a view illustrating one example of the configuration of the status generator 607 according to the second modification. This example involves that the status generator 607 generates a status.

The status generator 607 includes a counter 651, a comparator 653 and a multiplexer 655. In the status generator 607, these components include circuits.

The counter 651 is electrically connected to the comparator 653 and the multiplexer 655. The counter 651 counts the number of bits of boosted write data from a control signal and the like input from the data buffer 603 and the write current driver 605, and outputs the counted number of bits (i.e., a measured value of the number of bits) to the comparator 653 and the multiplexer 655.

The comparator 653 is electrically connected to the multiplexer 655. The comparator 653 compares an expectation of the number of bits to be boosted (hereinafter, referred to as a bit expectation) with the measured value of the number of bits. When the bit expectation matches the measured value of the number of bits, the comparator 653 determines that the boost is being executed as the expectation, and outputs a signal indicating "OK" as a status. When the bit expectation does not match the measured value of the number of bits, the comparator 653 determines that the boost is not being executed as the expectation, and outputs a signal indicating "NG" as a status. The comparator 653 may receive the bit expectation from the system controller 130 via the status signal I/F 1440 or a register I/F.

The multiplexer 655 outputs the measured value of the number of bits of the counter 651, as measured data, to the system controller 130 or outputs the status input from the comparator 653, as a status signal, to the system controller 130.

In the second modification, upon receiving the status signal from the head amplifier IC 60 at the time of ending of the write operation, the system controller 130 may adjust a phase skew and the bit skew according to the input status signal.

In addition, the system controller 130 stores the bit expectation in a memory, e.g., the volatile memory 70, the buffer memory 80, the nonvolatile memory 90 or the like. Upon receiving the measured data from the head amplifier IC 60 at the time of ending of the write operation, the system controller 130 compares the bit expectation with the measured data. The system controller 130 may adjust a phase skew and a bit skew according to a result of the comparison.

The second modification may achieve the same effects as the above-described embodiment. In addition, the configuration of the magnetic disk device 1 according to the second modification may also be applied to a normal write in addition to the DDW processing. For example, when random data is written in the disk 10, the magnetic disk device 1 counts the number of bits of random data actually written in the disk 10. The magnetic disk device 1 compares the bit expectation of random data with the number of bits of random data actually written in the disk 10. The magnetic disk device 1 may also generate a status indicating whether or not the bit expectation matches the number of bits of random data.

(Third Modification)

A magnetic disk device 1 according to a third modification is different from the magnetic disk device 1 according to the above-described embodiment in that the former corrects a skew amount of a DDW control signal in which optimal phase skew and bit skew are added to a data pattern of write data added with the worst case WPC delay at the time of adjustment (hereinafter, simply referred to as an adjustment pattern) to a skew amount of a DDW control signal in which optimal phase skew and bit skew are added to a data pattern of write data added with the worst case WPC delay at the time of actual write (hereinafter, simply referred to as a write pattern). A delay including a phase skew and a bit skew is called a skew amount. In addition, for convenience of description, the skew amount of a DDW control signal added with the optimum phase skew and bit skew is simply referred to as the optimum skew amount of the DDW control signal.

Figure 15:
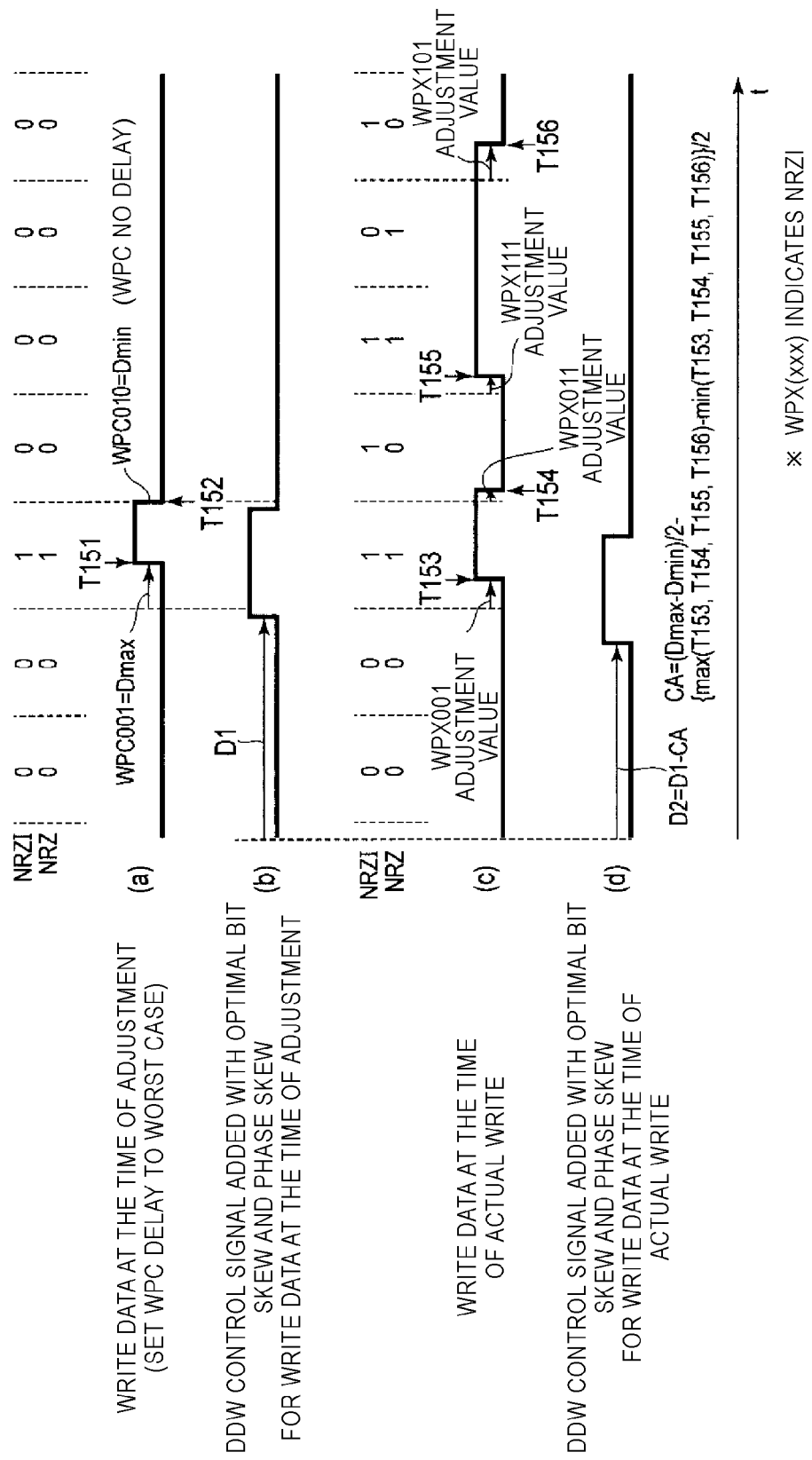
FIG. 15 is a view illustrating one example of a method for correcting a skew amount of a DDW control signal corresponding to write data added with the worst case WPC delay at a time of actual write according to a third modification.

FIG. 15 is a view illustrating one example of a method for correcting a skew amount of a DDW control signal corresponding to write data added with the worst case WPC delay at the time of actual write according to the third modification. FIG. 15 illustrates a bit pattern of Non Return to Zero (NRZ) and a bit pattern of Non Return to Zero Inverse (NRZI). In FIG. 15, a horizontal axis represents time t. In FIG. 15, it is assumed that all bit intervals of the write data and the DDW control signal are 1T. In FIG. 15, line (a) illustrates one example of a data pattern of the write data added with the worst case WPC delay Dmax at the time of adjustment of a phase skew (hereinafter, simply referred to as the time of adjustment). In line (a) of FIG. 15, the WPC delay Dmax is added at a rising timing T151 of the data pattern of the write data. In line (a) of FIG. 15, the rising timing T151 is indicated by "001" in NRZI. Similarly, at the time of falling, a WPC delay Dmin is added at a falling timing T152 of the data pattern of the write data. In line (a) of FIG. 15, the falling timing T152 is indicated by "010" in NRZI. In FIG. 15, line (b) illustrates a DDW control signal in which a bit skew and a phase skew adjusted for the write data for adjustment in line (a) are set, where D1 denotes a skew amount thereof. In FIG. 15, line (c) illustrates one example of a data pattern at the time of actual write. In line (c) of FIG. 15, with the WPC delay, a timing of polarity inversion for "001" becomes T153, a timing of polarity inversion for "011" becomes T154, a timing of polarity inversion for "111" becomes T155, and a timing of polarity inversion for "101" becomes T156. In FIG. 15, line (d) illustrates a DDW control signal in which a bit skew and a phase skew corrected based on D1 for line (c) are set, where D2 denotes a skew amount thereof and CA denotes a correction amount thereof.

In the first embodiment, the write data added with the worst case WPC delay is used to adjust the phase skew. Before actually executing the data write, since the WPC delay is again adjusted, there is a possibility that the worst case WPC delay at the time of adjustment is different from the worst case WPC delay at the time of actual write. Therefore, at the time of actual write, a correction process is required to correct a skew amount of the optimal DDW control signal for the adjustment pattern to a skew amount of the optimal DDW control signal for the write pattern. By executing such a correction process, the system controller 130 may output the write data added with the WPC delay at the time of actual write and the DDW control signal corresponding to the write data to the head amplifier IC 60.

For example, the system controller 130 derives a correction value CA from a difference between the midpoint of the worst case WPC delays Dmax and Dmin at the time of adjustment and the midpoint of the maximum value and the minimum value of the WPC delay at the time of actual write. In this case, the correction value CA is expressed by the following equation (1).

$$\text{Correction value } CA = (T151-T152)/2 - \{\max(T153, T154, T155, T156) - \min(T153, T154, T155, T156)\}/2 \quad (1)$$

Where, max( ) represents a function that outputs the maximum value and min( ) represents a function that outputs the minimum value.

Before executing the DDW processing in the actual write processing, the system controller 130 uses the correction value CA derived by the equation (1) to correct the optimal DDW control signal for the adjustment pattern. For example, the system controller 130 uses the correction value CA derived by the expression (1) to correct the skew amount D1 of the optimal DDW control signal for the adjustment pattern illustrated in line (b) of FIG. 15 to the skew amount D2 of the optimal DDW control signal for the write pattern illustrated in line (d) of FIG. 15. In the example illustrated in FIG. 15, the system controller 130 derives the skew amount D2 from a difference between the skew amount D1 and the correction value CA. The WPC correction pattern is illustrated as a 4-state correction system (2-bit lookback) in this example, but the skew amount correction processing may be carried out for 5 or more-state correction systems in the same manner.

According to the third modification, since the magnetic disk device 1 corrects the skew amount of the optimal DDW control signal for the adjustment pattern to the skew amount of the optimal DDW control signal for the write pattern, it is possible to secure a timing margin over the above-described embodiment. Therefore, the magnetic disk device 1 may improve the write characteristics.

Second Embodiment

A magnetic disk device 1 according to a second embodiment is different from that according to the first embodiment in that the head amplifier IC 60 executes the DDW processing by the DDW control signal generated based on the write data by the head amplifier IC 60. Hereinafter, generation of the DDW control signal by the head amplifier IC 60 is referred to as a preamplifier mode. Further, the DDW processing in the head amplifier IC 60 is referred to as DDW processing in the preamplifier mode.

Figure 16:
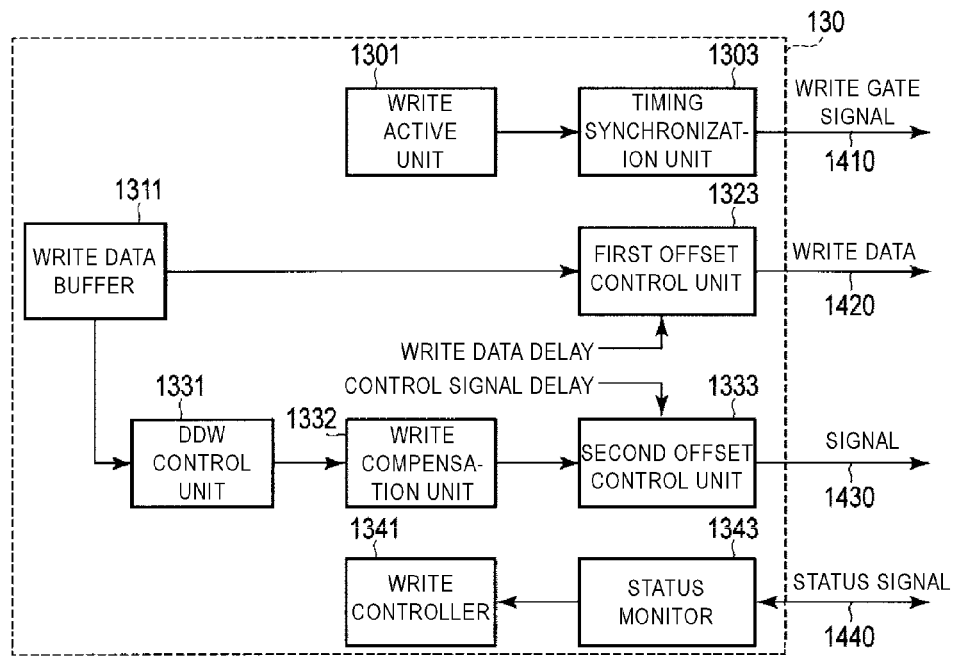
FIG. 16 is a schematic view illustrating a configuration example of a write system in a system controller according to a second embodiment.

FIG. 16 is a schematic view illustrating a configuration example of a write system in the system controller 130 of the second embodiment.

The system controller 130 (the R/W channel 50) includes, as a write system, a write compensation unit 1332 between the DDW control unit 1331 and the second offset control unit 1333.

The DDW control unit 1331 is electrically connected to the write compensation unit 1332. The DDW control unit 1331 outputs a clock signal to the write compensation unit 1332. The write compensation unit 1332 includes a circuit and is electrically connected to the second offset control unit 1333. The write compensation unit 1332 executes write compensation processing for the clock signal input from the DDW control unit 1331 and outputs the write compensated clock signal to the second offset control unit 1333. Based on a status signal input from the status monitor 1343, the write controller 1341 generates a profile indicating the state of synchronization of the write data and the clock signal, etc.

Figure 17:
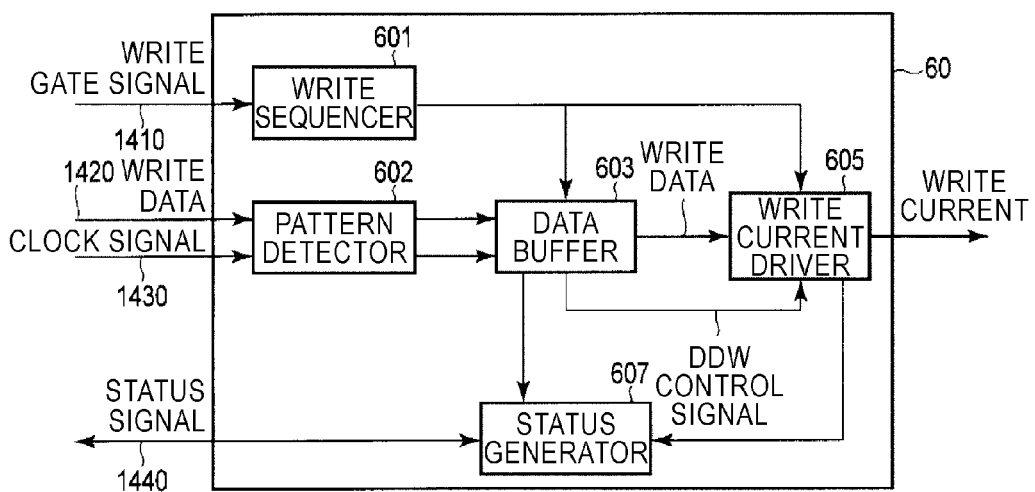
FIG. 17 is a schematic view illustrating a configuration example of a write system in a head amplifier IC according to the second embodiment.

FIG. 17 is a schematic view illustrating a configuration example of a write system in the head amplifier IC 60 according to the second embodiment.

The head amplifier IC 60 includes a pattern detector 602 as a write system. The pattern detector 602 is electrically connected to the data buffer 603. The pattern detector 602 generates a data pattern based on the write data and the clock signal input from the system controller 130. The pattern detector 602 outputs the generated data pattern, as write data to be written in the disk (hereinafter, referred to as write current data), to the data buffer 603. The pattern detector 602 generates a DDW control signal (DDW flag) instructing a timing of execution of a boost at a specific timing of polarity inversion of the generated write current data, and outputs the generated DDW control signal to the data buffer 603. The pattern detector 602 outputs, via the data buffer 603, information such as a result of the generation of the write current data based on the write data and the clock signal input from the system controller 130, to the status generator 607.

The data buffer 603 temporarily holds the write current data and the DDW control signal input from the pattern detector 602. The data buffer 603 may output the write current data and the DDW control signal to the write current driver 605 according to a control signal input from the write sequencer 601. The data buffer 603 outputs the write current data, the DDW control signal, and associated information, as control signals, to the status generator 607. The pattern detector 602 and the data buffer 603 may be integrally formed.

The write current driver 605 outputs a write current corresponding to the write current data to the head 15. In addition, the write current driver 605 executes DDW processing based on the write current data and the DDW control signal (DDW flag) input from the data buffer 603.

From the write current data, the DDW control signal and the control signal input from the data buffer 603, the status generator 607 generates information (status) indicating a result of the generation of the write current data based on the write data and the clock signal input from the system controller 130. The status generator 607 outputs the generated status, as a status signal, to the status monitor 1343 via the status signal I/F 1440. In addition, from the write current data, the DDW control signal and the control signal input from the data buffer 603 and the write current driver 605, the status generator 607 may generate information (status) indicating a result of the generation of the write current data based on the write data and the clock signal input from the system controller 130.

Figure 18:
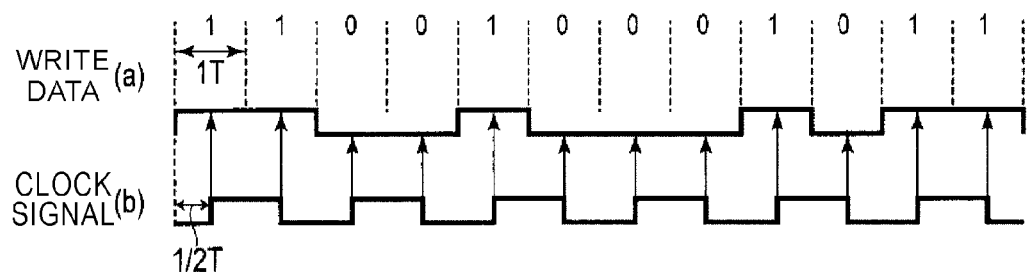
FIG. 18 is a view for illustrating one example of a method for generating write current data in a preamplifier mode in a case where a clock signal is subjected to no write compensation processing.

FIG. 18 is a view for illustrating one example of a method for generating write current data in a preamplifier mode in a case where the clock signal is subjected to no write compensation processing. In FIG. 18, it is assumed that a bit interval of one bit data is 1T. In addition, it is assumed that all bit intervals of the clock signal are 1T. In FIG. 18, line (a) illustrates one example of a data pattern corresponding to a bit pattern. In FIG. 18, line (b) illustrates one example of a data pattern of the clock signal. In FIG. 18, a phase skew (½T) is added to the clock signal such that a timing of polarity inversion of the clock signal becomes equal to a timing of the median (½T) of bit intervals of each bit of the write data.

In the example illustrated in FIG. 18, the head amplifier IC 60 detects the data pattern of the write data at the timing of polarity inversion of the clock signal added with the phase skew (½T), and generates write current data corresponding to the detected data pattern. That is, the head amplifier IC 60 adjusts the timing of polarity inversion of the write current data to the timing of polarity inversion of the clock signal. For example, the head amplifier IC 60 generates write current data in synchronization with the clock signal. The head amplifier IC 60 generates a DDW control signal for executing a boost at a certain timing of polarity inversion of the write current data. The head amplifier IC 60 executes the DDW processing based on the write current data and the DDW control signal.

Figure 19:
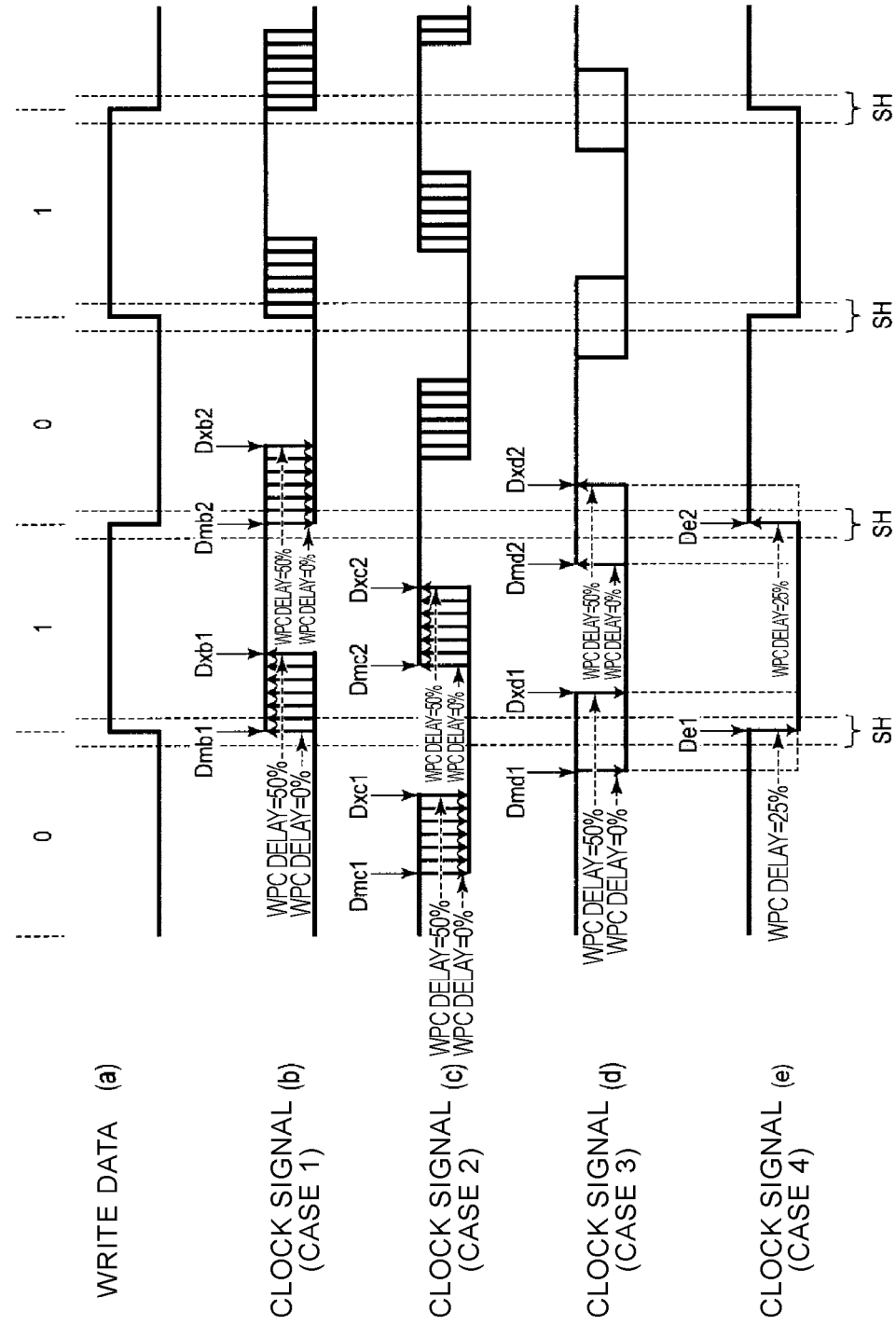
FIG. 19 is a view illustrating one example of a clock signal which is subjected to the write compensation processing and is added with a phase skew.

FIG. 19 is a view illustrating one example of the clock signal, which is subjected to the write compensation processing and is added with the phase skew, and the write data. In FIG. 19, it is assumed that all bit intervals of the write data and the clock signal is 1T. Further, the clock signal has a predetermined range (e.g., 0% to 50%) of WPC delay added to a timing of polarity inversion of a signal pattern. FIG. 19 illustrates rising timings Dmb1, Dmc2, Dmd2, . . . of the clock signal added with the minimum value 0% of the WPC delay, rising timings Dxb1, Dxc2 and Dxd2 of the clock signal added with the maximum value 50% of the WPC delay, falling timings Dmb2, Dmc1, Dmd1 . . . of the clock signal added with the minimum value 0% of the WPC delay, falling timings Dxb2, Dxc1, Dxd1 . . . of the clock signal added with the minimum value 0% of the WPC delay, a rising timing De2 of the clock signal added with the median 25% of the maximum value 50% and minimum value 0% of the WPC delay, and a falling timing De1 of the clock signal added with the median 25% of the WPC delay. In addition, FIG. 19 illustrates a Setup/Hold violation range SH. The Setup/Hold violation range SH indicates a change prohibition period of write data at rising and falling timings. In FIG. 19, the Setup/Hold violation range SH is set to a specific section of the timing of polarity inversion of the write data. In FIG. 19, for the sake of convenience of explanation, a part of the data pattern of the write data and a part of the data pattern of the clock signal corresponding to the part of the data pattern of the write data are used for explanation. However, the same configuration may be applied to data patterns of other write data and other data patterns of the clock signal corresponding to the data patterns of the other write data.

In FIG. 19, line (a) illustrates one example of the data pattern of the write data. In FIG. 19, line (b) illustrates one example of the clock signal of Case 1 where the rising timing Dmb1 and the falling timing Dmb2 are located in the Setup/Hold violation range SH. In FIG. 19, line (c) illustrates one example of the clock signal of Case 2 where a range of rising timing from Dmc2 to Dxc2 and a range of falling timing from Dmc1 to Dxc1 are located out of the Setup/Hold violation range SH. In FIG. 19, line (d) illustrates one example of the clock signal of Case 3 where the Setup/Hold violation range SH is located between the rising timings Dmd2 and Dxd2 and between the falling timings Dmd1 and Dxd1. In FIG. 19, line (e) illustrates one example of the clock signal of Case 4 where the falling timing De1 and the rising timing De2 are located in the Setup/Hold violation range SH. In FIG. 19, line (e) illustrates a case where the median 25% of the maximum value 50% and the minimum value 0% of the WPC delay is added to the timing of polarity inversion of the clock signal illustrated in line (d) of FIG. 19.

The head amplifier IC 60 may generate a Setup/Hold violation at the rising timing Dmb1 and the falling timing Dmb2 of the clock signal of Case 1. When the Setup/Hold violation is generated, the pattern detector 602 is likely to detect a data pattern of erroneous write data.

In a range from the rising timing Dmc2 to the rising timing Dxc2 of the clock signal of Case 2 and a range from the falling timing Dmc1 to the falling timing Dxc1 thereof, even when the WPC delay has any value within a range of 0% to 50%, the head amplifier IC 60 may detect a data pattern of the write data. That is, when the clock signal of Case 2 is used, the pattern detector 602 may detect the data pattern of the write data without being affected by a set value of the WPC delay.

The head amplifier IC 60 may detect a data pattern of the write data at the rising timings Dmd2 and Dxd2 and the falling timings Dmd1 and Dxd1 of the clock signal of Case 3. However, in a range from the rising timing Dmd2 to the rising timing Dxd2 of the clock signal or a range from the falling timing Dmd1 to the falling timing Dxd1 thereof by the WPC delay, the head amplifier IC 60 may generate a Setup/Hold violation at a rising timing and a falling timing.

In the preamplifier mode, in order to prevent the clock signal of Case 1 or Case 3 from being output, the clock signal of Case 4 added with the WPC delay and the skew delay so that a rising timing and a falling timing of the clock signal are located in the Setup/Hold violation range is used to adjust a phase skew to be added to the DDW control signal. In the example illustrated in FIG. 19, as illustrated in line (b) of FIG. 19, a skew delay is added to the clock signal so that a rising timing added with the maximum value of the WPC delay and a falling timing added with the minimum value of the WPC delay span over the Setup/Hold violation range of the write data. Further, the clock signal is added with a WPC delay of the median 25% of the minimum value 0% and the maximum value 50% of the range of the WPC delay at the rising timing of the clock signal. Like the rising timing, the clock signal is added with a WPC delay of the median 25% at the falling timing of the clock signal. Therefore, the timing of polarity inversion of the clock signal is located in the Setup/Hold violation range of the write data. In this manner, the phase skew to be added to the DDW control signal is adjusted using the clock signal whose timing of polarity inversion is located in or near the Setup/Hold violation range.

Figure 20:
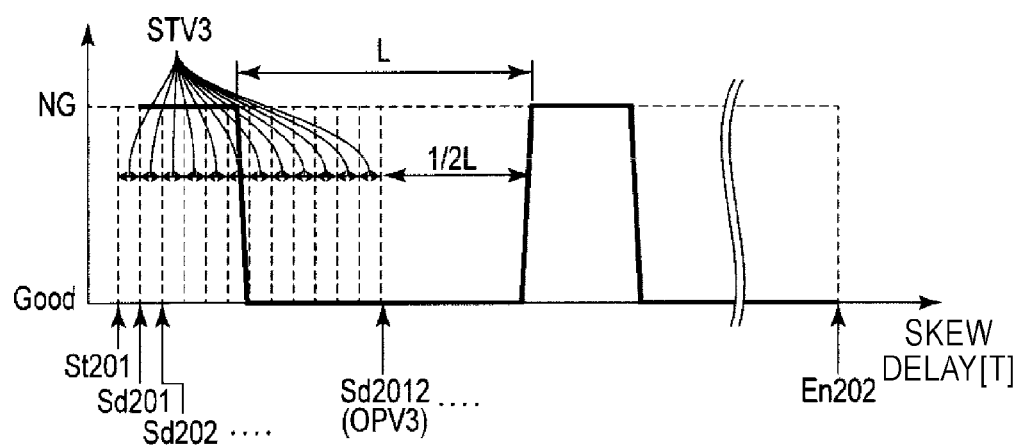
FIG. 20 is a graphical view illustrating one example of a method for adjusting a phase skew in the preamplifier mode.

FIG. 20 is a graphical view illustrating one example of a method for adjusting a phase skew in the preamplifier mode.

In FIG. 20, a vertical axis represents whether write data may be detected (Good) or not (NG) and a horizontal axis represents a skew delay[T]. FIG. 20 illustrates a process of increasing a skew delay to be added to a clock signal by a certain value from a start value St201 to an end value En202 and detecting whether or not write data may be detected at a timing of polarity inversion of the clock signal added with a particular WPC delay.

In order to adjust the phase skew to the optimal value, the system controller 130 sets the WPC delay to a constant value. For example, the system controller 130 sets the WPC delay to the median of its maximum value and its minimum value. The system controller 130 sets the start value of the skew delay so that the timing of polarity inversion of the clock signal added with the WPC delay of the constant value is located near the Setup/Hold violation range. The system controller 130 stepwise adds a skew delay, which is shifted from the start value to the end value by a bit interval of less than 1 bit, to the clock signal. For example, the head amplifier IC 60 detects whether or not write data can be detected at a timing of polarity inversion of each of clock signals added stepwise with the skew delay. From a result of the detection corresponding to each skew delay, the head amplifier IC 60 generates a status indicating whether or not the write data can be detected at the timing of polarity inversion of each of clock signals added stepwise with the skew delay, and outputs the generated status, as a status signal, to the system controller 130. The system controller 130 generates a profile indicating a relationship between the skew delay and the status indicating whether or not the write data can be detected at the timing of polarity inversion of each of clock signals added with the skew delay. The system controller 130 acquires the median of delays in a section where the write data can be detected in the generated profile, as the optimal value of the skew delay. The system controller 130 sets the acquired optimal value as a phase skew.

In the example illustrated in FIG. 20, first, the system controller 130 sets the WPC delay to a constant value. For example, the system controller 130 sets the WPC delay to the midpoint of its maximum value and its minimum value (hereinafter, simply referred to a WPC delay of the median). The system controller 130 sets a skew delay St201 whose timing of polarity inversion of the clock signal is located near the Setup/Hold violation range, to the start value. The system controller 130 outputs the clock signal added with the skew delay St201 as the start value and the WPC delay of the median, and the write data to the head amplifier IC 60. The head amplifier IC 60 detects whether or not the write data can be detected at a timing of polarity inversion of the clock signal added with the WPC delay of the median and the skew delay St201. The head amplifier IC 60 detects that the write data cannot be detected at the timing of polarity inversion of the clock signal added with the WPC delay of the median and the skew delay St201. The head amplifier IC 60 generates a status indicating that the write data cannot be detected at the timing of polarity inversion of the clock signal added with the WPC delay of the median and the skew delay St201, and outputs the generated status, as a status signal, to the system controller 130.

Next, the system controller 130 outputs the clock signal added with a skew delay Sd201 obtained by adding a step value STV3 to the skew delay St201 and the WPC delay of the median, and the write data, to the head amplifier IC 60. The head amplifier IC 60 detects whether or not the write data can be detected at a timing of polarity inversion of the clock signal added with the skew delay Sd201. The head amplifier IC 60 detects that the write data cannot be detected at the timing of polarity inversion of the clock signal added with the skew delay Sd201 and the WPC delay of the median. The head amplifier IC 60 generates a status indicating that the write data cannot be detected at the timing of polarity inversion of the clock signal added with the skew delay Sd201 and the WPC delay of the median, and outputs the generated status, as a status signal, to the system controller 130.

Similarly, the system controller 130 outputs the clock signal added stepwise with the skew delays Sd202, Sd2012, increased by the step value STV3, the skew delay En202 (the end value) and the WPC delay of the median, and the write data to the head amplifier IC 60, respectively. The head amplifier IC 60 detects whether or not the write data can be detected at a timing of polarity inversion of the clock signal added with the skew delays Sd202, Sd2012, . . . , the skew delay En202 (the end value) and the WPC delay of the median, respectively.

For example, the head amplifier IC 60 detects that the write data cannot be detected at the timing of polarity inversion of the clock signal added with the skew delay Sd202 and the WPC delay of the median. The head amplifier IC 60 generates a status indicating that the write data cannot be detected at the timing of polarity inversion of the clock signal added with the skew delay Sd202 and the WPC delay of the median, and outputs the generated status, as a status signal, to the system controller 130.

The head amplifier IC 60 detects that the write data can be detected at the timing of polarity inversion of the clock signal added with the skew delay Sd2012 and the WPC delay of the median. The head amplifier IC 60 generates a status indicating that the write data can be detected at the timing of polarity inversion of the clock signal added with the skew delay Sd2012 and the WPC delay of the median, and outputs the generated status, as a status signal, to the system controller 130.

The head amplifier IC 60 detects that the write data cannot be detected at the timing of polarity inversion of the clock signal added with the skew delay En202 and the WPC delay of the median. The head amplifier IC 60 generates a status indicating that the write data cannot be detected at the timing of polarity inversion of the clock signal added with the skew delay En202 and the WPC delay of the median, and outputs the generated status, as a status signal, to the system controller 130.

From the status corresponding to a plurality of clock signals added with each skew delay and the WPC delay of the median, the system controller 130 generates a profile indicating a relationship between the skew delay and the status indicating whether or not the write data can be detected at the timing of polarity inversion of the clock signal added with the skew delay. The system controller 130 acquires the median Sd2012 of the skew delay located in ½L half a section L where the write data can be detected in the generated profile, as the optimal value OPV3 of the skew delay. The system controller 130 sets the optimal value OPV3 calculated in the course of adjustment, as a phase skew. In addition, the system controller 130 may stop the detection at the point of time when a profile of more than the section L where the write data can be detected can be generated, and acquire the median of skew delays of this section L as the optimal value OPV3 of the skew delays.

Figure 21:
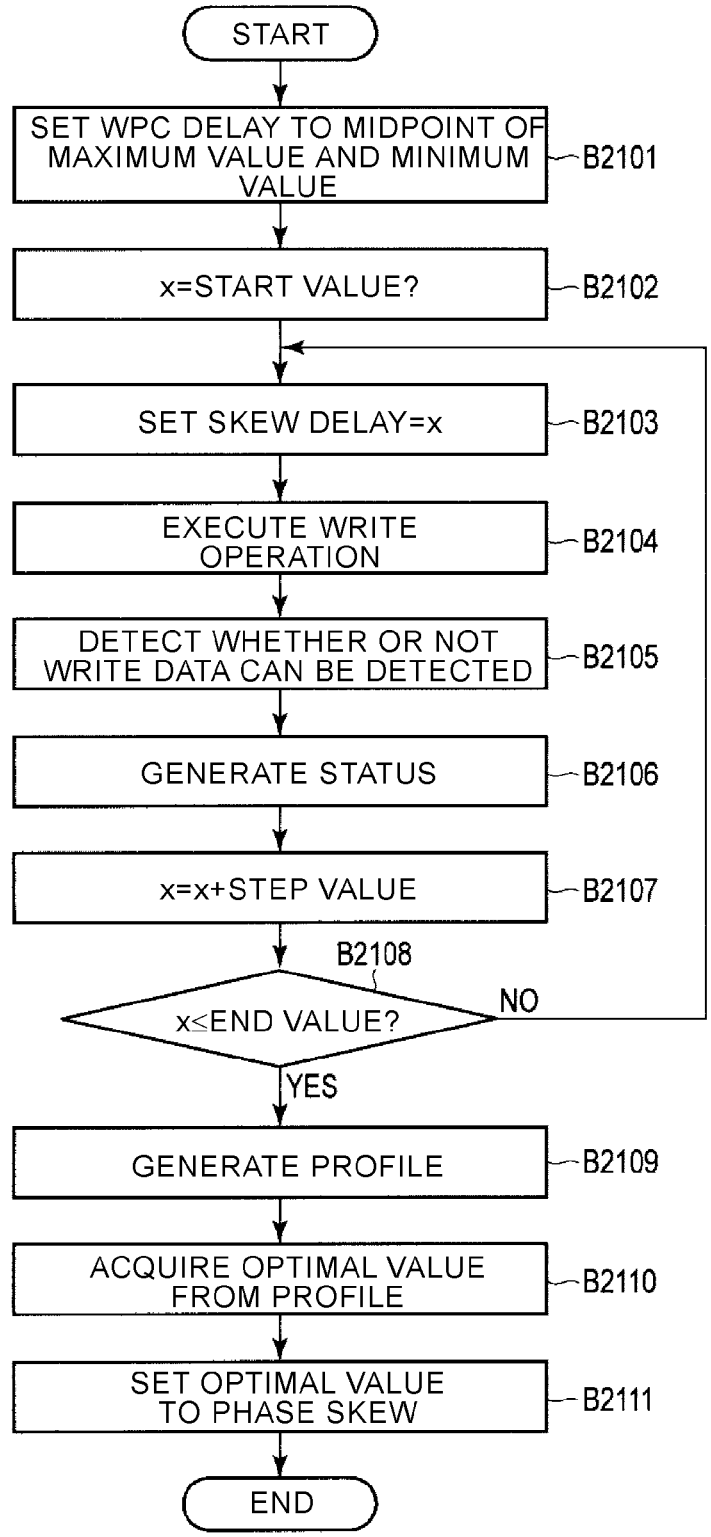
FIG. 21 is a flow chart illustrating one example of the method for adjusting the phase skew in the preamplifier mode.

FIG. 21 is a flow chart illustrating one example of a method for adjusting a phase skew in the preamplifier mode.

The system controller 130 sets a constant value, e.g., the midpoint of the maximum value and minimum value of the WPC delay, to the WPC delay (B2101) and sets x to the start value (B2102). At this time, the system controller 130 sets the start value at which the timing of polarity inversion of the clock signal is located near the Setup/Hold violation range to the midpoint. The system controller 130 sets the skew delay to x (B2103).

The system controller 130 executes a write operation (B2104). The system controller 130 outputs the clock signal, which is subjected to write compensation processing with a write gate signal for making the write processing active, the write data, and the WPC delay of the median and is added with the set skew delay x (the start value in the example), to the head amplifier IC 60.

The head amplifier IC 60 detects whether or not the write data can be detected at the timing of polarity inversion of the clock signal added with the set skew delay and the WPC delay input from the system controller 130 (B2105). The head amplifier IC 60 generates a status from a result of the detection (B2106). The head amplifier IC 60 outputs the generated status, as a status signal, to the system controller 130.

The system controller 130 adds a step value to the skew delay (B2107) and determines whether or not the skew delay has reached an end value (B2108). When it is determined that the skew delay has not reached the end value (NO in B2108), the system controller 130 returns to the operation of B2103. When it is determined that the skew delay has reached the end value (YES in B2108), the system controller 130 generates a profile indicating a relationship between the skew delay and the status indicating whether or not the write data can be detected at the timing of polarity inversion of the clock signal added with the skew delay and the WPC delay, from the status input from the head amplifier IC 60 (B2109). The system controller 130 acquires the optimal value of the skew delay from the generated profile (B2110), sets the acquired optimal value as a phase skew (B2111), and ends the process.

In the second embodiment, as illustrated in FIGS. 10 and 11 in the first embodiment, the bit skew generated between the write data and the clock signal can be adjusted. However, since a configuration equivalent to the method for adjusting the bit skew generated between the write data and the DDW control signal illustrated in the first embodiment can be applied, a description thereof will be omitted. In addition, the manufacturing process illustrated in FIG. 12 in the first embodiment can be applied to the second embodiment. In the second embodiment, in the operation of B1201 illustrated in FIG. 12, the system controller 130 executes one example of the phase skew adjusting method illustrated in FIGS. 20 and 21 to adjust the phase skew.

The second embodiment may achieve the same effects as the first embodiment.

Although the configuration for executing the DDW processing in the preamplifier mode illustrated in the second embodiment and the configuration for executing the DDW processing in the R/W channel mode illustrated in the first embodiment have been separately described, the magnetic disk device 1 may have both of these two configurations.

Figure 22:
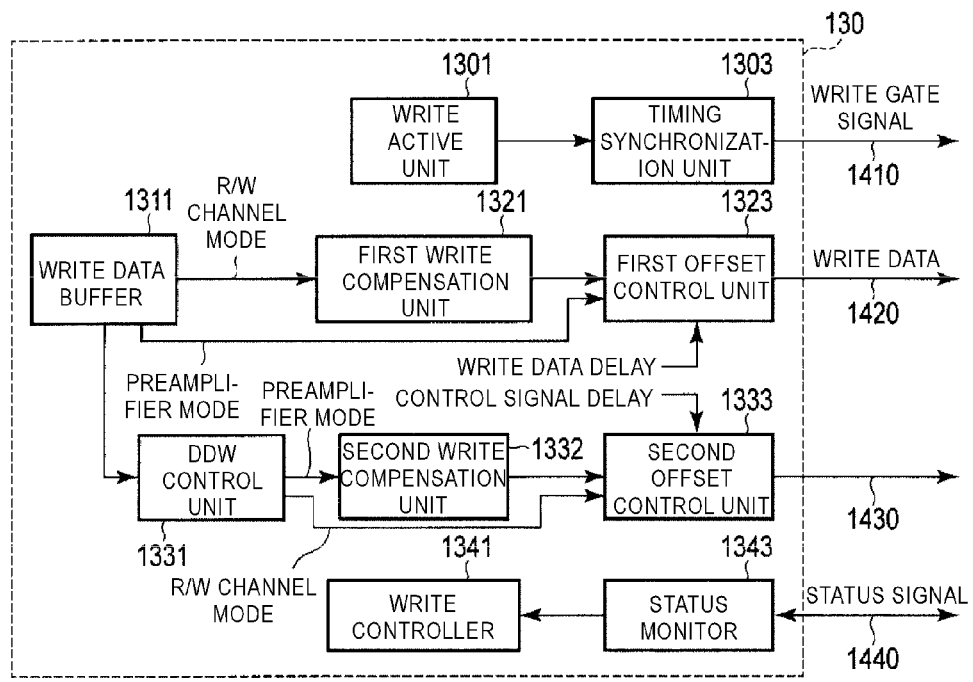
FIG. 22 is a schematic view illustrating a configuration example of a write system in a system controller for executing the DDW processing in the preamplifier mode and the R/W channel mode.

For example, FIG. 22 is a schematic view illustrating a configuration example of a write system in the system controller 130 for executing DDW processing in the preamplifier mode and the R/W channel mode. In FIG. 22, the system controller 130 includes the write compensation unit 1321 illustrated in FIG. 2 in the first embodiment and the write compensation unit 1332 illustrated in FIG. 16 in the second embodiment. For example, the system controller 130 can switch between the preamplifier mode and the R/W channel mode. When the preamplifier mode is set, the system controller 130 outputs the write data and the clock signal to a signal path in the preamplifier mode. When the R/W channel mode is set, the system controller 130 outputs the write data and the DDW control signal to a signal path in the R/W channel mode.

Figure 23:
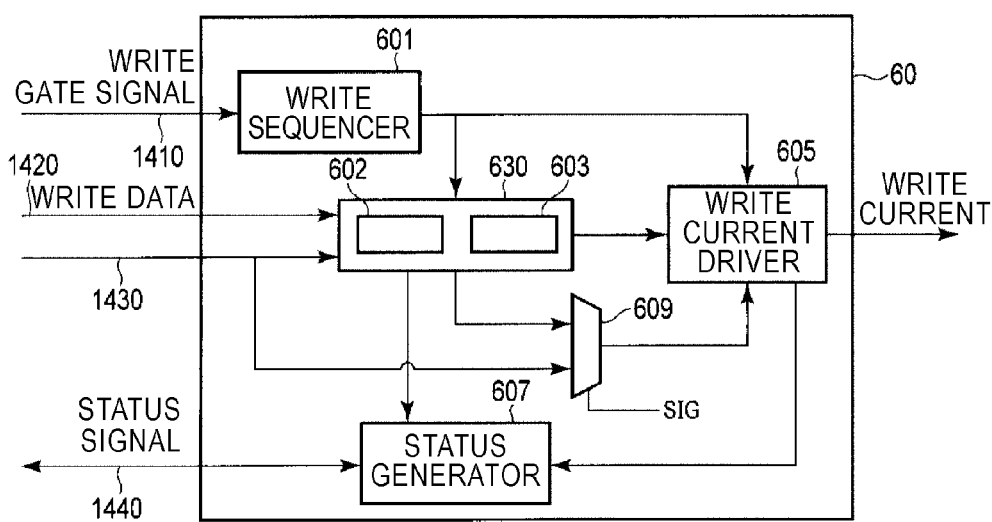
FIG. 23 is a schematic view illustrating a configuration example of a write system in a head amplifier IC for executing the DDW processing in the preamplifier mode and the R/W channel mode.

FIG. 23 is a schematic view illustrating a configuration example of a write system in the head amplifier IC 60 for executing DDW processing in the preamplifier mode and the R/W channel mode. The head amplifier IC 60 includes a signal processor 630 and a multiplexer 609. The signal processor 630 is electrically connected to the write current driver 605 and the status generator 607. The signal processor 630 includes a pattern detector 602 and a data buffer 603. The multiplexer 609 is electrically connected to the write current driver 605. According to a selection control input SIG, the multiplexer 609 outputs one of the DDW control signal input from the second offset control unit 1333 of the system controller 130 and the DDW control signal input from the data buffer 603 to the write current driver 605. For example, when the selection control input SIG in the R/W channel mode is input, the multiplexer 609 outputs the DDW control signal input from the second offset control unit 1333 of the system controller 130 to the write current driver 605. When the selection control input SIG in the preamplifier mode is input, the multiplexer 609 outputs the DDW control signal input from the signal processor 630 to the write current driver 605. With such a configuration, the magnetic disk device 1 can execute the DDW processing in the preamplifier mode and the R/W channel mode. In this case, the magnetic disk device 1 adjusts the phase skew and the bit skew in accordance with the preamplifier mode or the R/W channel mode. Further, the magnetic disk device 1 sets the phase skew and the bit skew acquired by adjustment according to the preamplifier mode or the R/W channel mode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An adjusting method for a magnetic disk device including a disk, a head that writes data on the disk, a controller circuit that outputs write data and a control signal related to the write data, and an integrated circuit that outputs a write current to the head, the method comprising:
   adding a delay to a timing of polarity inversion of one bit of the write data or the control signal;
   outputting the write data and the control signal added with the delay from the controller circuit to the integrated circuit;
   outputting from the integrated circuit to the head, the write current having a current value that is changed at one of timings of polarity inversion of the write data, according to the control signal; and
   adjusting a deviation between the write data and the control signal, based on the output write current.

2. The method according to claim 1, further comprising:
   generating a result of execution of the change in the current value of the write current, in the integrated circuit; and
   outputting the result of execution from the integrated circuit to the controller circuit.

3. The method according to claim 2, further comprising:
   outputting write data of a first bit pattern and control signal corresponding to the first bit pattern from the controller circuit to the integrated circuit;
   detecting a second bit pattern corresponding to the first bit pattern at a timing at which the current value of the write current is changed, in the integrated circuit;
   comparing the first bit pattern with the second bit pattern in the integrated circuit;
   outputting first information indicating whether or not the first bit pattern and the second bit patter match with each other from the integrated circuit to the controller circuit; and
   adjusting the deviation between the write data and the control signal according to the first information, in the controller circuit.

4. The method according to claim 2, further comprising:
   outputting a first value indicating the number of bits of the write data to be changed in the current value from the controller circuit to the integrated circuit;
   counting the number of bits of the write data changed in the current value of the write current, as a second value, in the integrated circuit;
   comparing the first value with the second value in the integrated circuit;
   outputting first information indicating whether or not the first value and the second value match with each other from the integrated circuit to the controller circuit; and
   adjusting the deviation between the write data and the control signal according to the first information, in the controller circuit.

5. The method according to claim 2, further comprising:
   adding a first delay with which an inversion interval of polarity inversion of the write data becomes shortest, to the write data, in the controller circuit;
   adding a second delay that has been set according to a rising timing among timings of polarity inversion of the write data added with the first delay, to the control signal, in the controller circuit;
   outputting the write data added with the first delay and the control signal added with the second delay from the controller circuit to the integrated circuit;
   changing the current value of the write current at the rising timing of the write data, according to the control signal, in the integrated circuit;
   detecting a logical value of the control signal at the rising timing of the write data in the integrated circuit; and
   outputting first information indicating a logical value of the control signal at the rising timing of the write data from the integrated circuit to the controller circuit.

6. The method according to claim 5, further comprising:
   adding a third delay obtained by adding a constant value to the second delay, in the controller circuit, to the control signal;
   outputting the write data added with the first delay and the control signal added with the third delay from the controller circuit to the integrated circuit;
   changing the current value of the write current at the rising timing among timings of polarity inversion of the write data according to the control signal added with the third delay, in the integrated circuit;
   detecting a logical value of the control signal added with the third delay at the rising timing of the write data, in the integrated circuit;

outputting second information indicating the logical value of the control signal added with the third delay at the rising timing of the write data from the integrated circuit to the controller circuit;

repeating a process of outputting information indicating the logical value of the control signal added with the third delay at the rising timing of the write data from the integrated circuit to the controller circuit, based on control signal added with a delay increased by the constant value and the write data added with the first delay;

generating a first profile indicating a relationship between the delay added to the control signal and increased by the constant value and the information indicating the logical value of the control signal, in the controller circuit; and setting a midpoint of delays in a section where the control signal rises in the first profile, as a first optimal value of the delay to be added to the control signal, in the controller circuit.

7. The method according to claim 6, further comprising:

adding the first optimal value to the control signal, in the controller circuit;

adding a fourth delay to the control signal added with the first optimal value, in the controller circuit;

outputting the write data added with the first delay and control signal added with the fourth delay and the first optimal value from the controller circuit to the integrated circuit;

outputting a first write current from the integrated circuit to the head, the first write current being based on the write data added with the first delay and the control signal added with the fourth delay and the first optimal value, in the integrated circuit;

measuring a bit error rate of first data corresponding to the first write current in the controller circuit;

repeating a process of outputting a write current from the integrated circuit to the write head, the write current being based on the control signal added with a delay increased by the constant value and the first optimal value and the write data added with the first delay, and a process of measuring a bit error rate of data corresponding to the write current based on the control signal added with a delay increased by the constant value and the first optimal value and the write data added with the first delay;

generating a second profile indicating a relationship between the delay added with the control signal and increased by the constant value and the bit error rate, in the controller circuit; and setting a delay having the smallest bit error rate in the second profile, as a second optimal value of the delay to be added to the control signal, in the controller circuit.

8. The method according to claim 2, further comprising:

adding a first delay equal to a midpoint of the maximum value and the minimum value of the delay, to the control signal that is a clock signal, in the controller circuit;

adding a second delay set such that a timing of polarity inversion of the control signal added with the first delay is located at the timing of polarity inversion of the write data, to the control signal, in the controller circuit;

outputting the write data and the control signal added with the first delay and the second delay from the controller circuit to the integrated circuit;

detecting a data pattern of the write data at a first timing of polarity inversion of the control signal added with the first delay and the second delay, in the integrated circuit; and outputting first information indicating whether or not the data pattern of the write data is detected at the first timing, from the integrated circuit to the controller circuit.

9. The method according to claim 8, further comprising:

adding a third delay obtained by adding a constant value to the second delay, in the controller circuit, to the control signal;

outputting the write data and the control signal added with the first delay and the third delay from the controller circuit to the integrated circuit;

detecting a data pattern of the write data at a second timing of polarity inversion of the control signal added with the first delay and the third delay, in the integrated circuit;

outputting second information indicating whether or not the data pattern of the write data is detected at the second timing, from the integrated circuit to the controller circuit;

repeating a process of outputting information indicating whether or not the data pattern of the write data is detected at a timing of polarity inversion of the control signal added with the first delay and a delay increased by the constant value, from the integrated circuit to the controller circuit;

generating a profile indicating a relationship between the delay added to the control signal and increased by the constant value and the information indicating whether or not the data pattern of the write data is detected, in the controller circuit; and setting a midpoint of delays in a section where the write data is detected in the profile, as an optimal value of the delay to be added to the control signal, in the controller circuit.

10. A manufacturing method for a magnetic disk device including a disk, a head that writes data on the disk, a controller circuit that outputs write data and a control signal related to the write data, and an integrated circuit that outputs a write current to the head, the method comprising:

adding a delay to a timing of polarity inversion of one bit of the write data or the control signal;

outputting the write data and the control signal added with the delay from the controller circuit to the integrated circuit;

outputting from the integrated circuit to the head, the write current having a current value that is changed at one of timings of polarity inversion of the write data, according to the control signal; and adjusting a deviation between the write data and the control signal, based on the output write current.

11. The method according to claim 10, further comprising:

generating a result of execution of the change in the current value of the write current, in the integrated circuit; and outputting the result of execution from the integrated circuit to the controller circuit.

12. The method according to claim 11, further comprising:

outputting write data of a first bit pattern and control signal corresponding to the first bit pattern from the controller circuit to the integrated circuit;

detecting a second bit pattern corresponding to the first bit pattern at a timing at which the current value of the write current is changed, in the integrated circuit;

comparing the first bit pattern with the second bit pattern in the integrated circuit;

outputting first information indicating whether or not the first bit pattern and the second bit patter match with each other from the integrated circuit to the controller circuit; and adjusting the deviation between the write data and the control signal according to the first information in the controller circuit.

13. The method according to claim 11, further comprising:

outputting a first value indicating the number of bits of the write data to be changed in the current value from the controller circuit to the integrated circuit;

counting the number of bits of the write data changed in the current value of the write current, as a second value, in the integrated circuit;

comparing the first value with the second value in the integrated circuit;

outputting first information indicating whether or not the first value and the second value match with each other from the integrated circuit to the controller circuit; and adjusting the deviation between the write data and the control signal according to the first information in the controller circuit.

14. The method according to claim 11, further comprising:

adding a first delay with which an inversion interval of polarity inversion of the write data becomes shortest, to the write data, in the controller circuit;

adding a second delay that has been set according to a rising timing among timings of polarity inversion of the write data added with the first delay, to the control signal, in the controller circuit;

outputting the write data added with the first delay and the control signal added with the second delay from the controller circuit to the integrated circuit;

changing the current value of the write current at the rising timing of the write data, according to the control signal, in the integrated circuit;

detecting a logical value of the control signal at the rising timing of the write data in the integrated circuit; and outputting first information indicating a logical value of the control signal at the rising timing of the write data from the integrated circuit to the controller circuit.

15. The method according to claim 14, further comprising:

adding a third delay obtained by adding a constant value to the second delay, in the controller circuit, to the control signal;

outputting the write data added with the first delay and the control signal added with the third delay from the controller circuit to the integrated circuit;

changing the current value of the write current at the rising timing among timings of polarity inversion of the write data according to the control signal added with the third delay, in the integrated circuit;

detecting a logical value of the control signal added with the third delay at the rising timing of the write data, in the integrated circuit;

outputting second information indicating the logical value of the control signal added with the third delay at the rising timing of the write data from the integrated circuit to the controller circuit;

repeating a process of outputting information indicating the logical value of the control signal added with the third delay at the rising timing of the write data from the integrated circuit to the controller circuit, based on control signal added with a delay increased by the constant value and the write data added with the first delay;

generating a first profile indicating a relationship between the delay added to the control signal and increased by the constant value and the information indicating the logical value of the control signal, in the controller circuit; and setting a midpoint of delays in a section where the control signal rises in the first profile, as a first optimal value of the delay to be added to the control signal, in the controller circuit.

16. The method according to claim 15, further comprising:

adding the first optimal value to the control signal, in the controller circuit;

adding a fourth delay to the control signal added with the first optimal value, in the controller circuit;

outputting the write data added with the first delay and control signal added with the fourth delay and the first optimal value from the controller circuit to the integrated circuit;

outputting a first write current from the integrated circuit to the head, the first write current being based on the write data added with the first delay and the control signal added with the fourth delay and the first optimal value, in the integrated circuit;

measuring a bit error rate of first data corresponding to the first write current in the controller circuit;

repeating a process of outputting a write current from the integrated circuit to the write head, the write current being based on the control signal added with a delay increased by the constant value and the first optimal value and the write data added with the first delay, and a process of measuring a bit error rate of data corresponding to the write current based on the control signal added with a delay increased by the constant value and the first optimal value and the write data added with the first delay;

generating a second profile indicating a relationship between the delay added with the control signal and increased by the constant value and the bit error rate, in the controller circuit; and setting a delay having the smallest bit error rate in the second profile, as a second optimal value of the delay to be added to the control signal, in the controller circuit.

17. The method according to claim 11, further comprising:

adding a first delay equal to a midpoint of the maximum value and the minimum value of the delay, to the control signal that is a clock signal, in the controller circuit;

adding a second delay set such that a timing of polarity inversion of the control signal added with the first delay is located at the timing of polarity inversion of the write data, to the control signal, in the controller circuit;

outputting the write data and the control signal added with the first delay and the second delay from the controller circuit to the integrated circuit;

detecting a data pattern of the write data at a first timing of polarity inversion of the control signal added with the first delay and the second delay, in the integrated circuit; and outputting first information indicating whether or not the data pattern of the write data is detected at the first timing, from the integrated circuit to the controller circuit.

18. The method according to claim 17, further comprising:

adding a third delay obtained by adding a constant value to the second delay, in the controller circuit, to the control signal;

outputting the write data and the control signal added with the first delay and the third delay from the controller circuit to the integrated circuit;

detecting a data pattern of the write data at a second timing of polarity inversion of the control signal added with the first delay and the third delay, in the integrated circuit;

outputting second information indicating whether or not the data pattern of the write data is detected at the second timing, from the integrated circuit to the controller circuit;

repeating a process of outputting information indicating whether or not the data pattern of the write data is detected at a timing of polarity inversion of the control signal added with the first delay and a delay increased by the constant value, from the integrated circuit to the controller circuit;

generating a profile indicating a relationship between the delay added to the control signal and increased by the constant value and the information indicating whether or not the data pattern of the write data is detected, in the controller circuit; and setting a midpoint of delays in a section where the write data is detected in the profile, as an optimal value of the delay to be added to the control signal, in the controller circuit.

19. A magnetic disk device comprising:

a disk;

a head that writes data on the disk;

a controller circuit that outputs write data and a control signal related to the write data, adds a delay to a timing of polarity inversion of one bit of the write data or the control signal, and outputs the write data and the control signal added with the delay; and an integrated circuit that outputs a write current having a current value that is changed at one of timings of polarity inversion of the write data input from the controller circuit, to the head according to the control signal input from the controller circuit, wherein the controller circuit adjusts a deviation between the write data and the control signal, based on the output write current.

20. The device according to claim 19, wherein the integrated circuit counts the number of bits of the write data changed in the current value of the write current, as a count value, compares an expectation value indicating the number of bits of the write data to be changed in the current value with the count value, generates first information indicating whether or not the expectation value and the count value match with each other, and outputs the generated first information to the controller circuit.

* * * * *